(12) United States Patent
 Iida et al.

(10) Patent No.: US 12,683,053 B2
(45) Date of Patent: Jul. 14, 2026

(54) SOLENOID, SOLENOID VALVE, SHOCK ABSORBER, AND METHOD FOR MANUFACTURING A SOLENOID

(71) Applicant: Hitachi Astemo, Ltd., Ibaraki (JP)

(72) Inventors: Tomohiko Iida, Hitachinaka (JP); Shunsuke Mori, Hitachinaka (JP); Hiroshi Yamagai, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 452 days.

(21) Appl. No.: 18/027,997

(22) PCT Filed: Sep. 17, 2021

(86) PCT No.: PCT/JP2021/034287
§ 371 (c)(1),
(2) Date: Mar. 23, 2023

(87) PCT Pub. No.: WO2022/091632
PCT Pub. Date: May 5, 2022

(65) Prior Publication Data
US 2023/0343499 A1    Oct. 26, 2023

(30) Foreign Application Priority Data

Oct. 26, 2020    (JP) ................................. 2020-178999

(51) Int. Cl.
*F16F 9/46*         (2006.01)
*F16F 9/19*         (2006.01)
(Continued)

(52) U.S. Cl.
CPC ................ *H01F 7/081* (2013.01); *F16F 9/19* (2013.01); *F16F 9/461* (2013.01);
(Continued)

(58) Field of Classification Search
CPC . F16F 9/463; F16F 9/919; F16F 9/461; H01F 7/081; H01F 7/1607; H01F 7/16;
(Continued)

(56) References Cited

U.S. PATENT DOCUMENTS 4,554,406 A * 11/1985 Slavin ...................... H01F 41/10
                                                    174/94 R
4,720,646 A * 1/1988 Torimoto ............... H02K 3/525
                                                    310/194
(Continued)

FOREIGN PATENT DOCUMENTS

JP         2002-43122         2/2002
JP         2003-158012         5/2003
(Continued)

OTHER PUBLICATIONS

International Search Report issued Nov. 30, 2021 in International Application No. PCT/JP2021/034287, with English translation.
(Continued)

*Primary Examiner* — Thomas J Williams
(74) *Attorney, Agent, or Firm* — Wenderoth, Lind & Ponack, L.L.P.

(57)         ABSTRACT
A solenoid includes a coil bobbin, a coil, a terminal, a housing, an armature, an actuation pin, and the like. The coil bobbin includes a tubular portion, and a first flange portion formed on one end of the tubular portion and extending radially to outside the tubular portion. The coil is wound around the coil bobbin. The terminal connects a terminal conductor portion of the coil and a cable. The terminal includes a joint portion that joins the terminal conductor portion of the coil. The joint portion extends in a direction along one end surface of the first flange portion.

12 Claims, 12 Drawing Sheets

(51) Int. Cl.

| | |
|---|---|
| *F16K 31/06* | (2006.01) |
| *H01F 5/04* | (2006.01) |
| *H01F 7/08* | (2006.01) |
| *H01F 7/16* | (2006.01) |
| *H01F 41/06* | (2016.01) |
| *H01F 41/10* | (2006.01) |
| *B60G 13/08* | (2006.01) |
| *B60G 17/08* | (2006.01) |
| *H01F 7/06* | (2006.01) |

(52) U.S. Cl.
CPC ...... *F16K 31/0655* (2013.01); *F16K 31/0675* (2013.01); *H01F 5/04* (2013.01); *H01F 7/1607* (2013.01); *H01F 41/06* (2013.01); *H01F 41/10* (2013.01); *B60G 13/08* (2013.01); *B60G 17/08* (2013.01); *B60G 2202/24* (2013.01); *B60G 2206/41* (2013.01); *B60G 2500/11* (2013.01); *B60G 2600/20* (2013.01); *B60G 2600/26* (2013.01); *B60G 2800/162* (2013.01); *F16F 2222/12* (2013.01); *F16F 2228/066* (2013.01); *F16F 2230/18* (2013.01); *H01F 2007/062* (2013.01)

(58) Field of Classification Search
CPC .... H01F 41/06; H01F 2007/062; H01F 41/10; H01F 5/04; B60G 2600/26
See application file for complete search history.

(56) References Cited

U.S. PATENT DOCUMENTS

| | | | | |
|---|---|---|---|---|
| 5,058,821 | A * | 10/1991 | Yamashita | H01F 5/02 336/208 |
| 5,097,242 | A * | 3/1992 | Onishi | H01F 5/04 307/106 |
| 6,369,982 | B2 * | 4/2002 | Saliba | G11B 15/602 |
| 7,312,681 | B1 * | 12/2007 | Maeda | H01F 41/10 29/606 |
| 2014/0291089 | A1 * | 10/2014 | Konakai | F16F 9/34 188/314 |
| 2017/0110230 | A1 | 4/2017 | Watanabe | |
| 2020/0043640 | A1 | 2/2020 | Arai | |
| 2023/0343499 | A1 * | 10/2023 | Iida | F16F 9/461 |

FOREIGN PATENT DOCUMENTS

| | | |
|---|---|---|
| KR | 10-2017-0045721 | 4/2017 |
| KR | 10-2019-0104358 | 9/2019 |

OTHER PUBLICATIONS

Written Opinion of the International Searching Authority issued Nov. 30, 2021 in International Application No. PCT/JP2021/034287, with English translation.
Office Action issued Mar. 25, 2024 in Korean Patent Application No. 10-2023-7001334, with English-language Translation.

* cited by examiner

SOLENOID, SOLENOID VALVE, SHOCK ABSORBER, AND METHOD FOR MANUFACTURING A SOLENOID

TECHNICAL FIELD

The present disclosure relates to a solenoid, a solenoid valve, a shock absorber, and a method for manufacturing a solenoid used to, for example, adjust a damping force for damping a vibration of a vehicle.

BACKGROUND ART

Generally, suspension apparatuses such as semi-active suspensions mounted on vehicles are equipped with a damping force adjustable shock absorber configured to variably adjust a damping force according to, for example, the running condition and the behavior of the vehicle. Then, one known type of the damping force adjustable shock absorber is a shock absorber using a solenoid as an electromagnetic actuator for variably adjusting the damping force. Further, the solenoid is also used in an electromagnetic valve that, for example, controls a hydraulic pressure as an electromagnetic actuator for controlling opening and closing of the valve.

For example, PTL 1 discloses a solenoid in which a coil made of an enameled wire is wound around a bobbin and a terminal is also provided on the end surface of the bobbin. In this case, the enameled wire of the coil is connected to a wire correction portion of the terminal by thermal caulking (fusing).

CITATION LIST

Patent Literature

PTL 1: Japanese Patent Application Public Disclosure No. 2003-158012

SUMMARY OF INVENTION

Technical Problem

Then, in the solenoid of PTL 1, the terminal protrudes upward from the bobbin in consideration of, for example, workability of fusing. Therefore, the axial dimension of the solenoid tends to increase due to the terminal. This results in an increase in the axial length of the solenoid valve, thereby raising a problem that, for example, the position of the solenoid may be constrained when the shock absorber is mounted on a vehicle, and flexibility for mounting onto the vehicle is impaired.

An object of one aspect of the present invention is to provide a solenoid, a solenoid valve, a shock absorber, and a method for manufacturing a solenoid valve capable of reducing the axial length of the solenoid, thereby increasing flexibility for mounting onto a vehicle.

Solution to Problem

According to one aspect of the present invention, a solenoid includes a bobbin including a tubular portion and a large-diameter portion formed on one end of the tubular portion and extending radially to outside the tubular portion, a coil wound around the bobbin, a terminal configured as a member that connects a terminal conductor portion of the coil and an external electric wire and including a joint portion that joins the terminal conductor portion of the coil and extends in a direction along one end surface of the large-diameter portion of the bobbin, a magnetic core fixed to an inner periphery of the coil, and a magnetic plunger provided movably closer to the core.

One aspect of the present invention is a method for manufacturing a solenoid. The solenoid includes a bobbin including a tubular portion and a large-diameter portion formed on one end of the tubular portion and extending radially to outside the tubular portion, a coil wound around the bobbin, and a terminal configured as a member that connects a terminal conductor portion of the coil and an external electric wire and is fixed to the large-diameter portion. The terminal includes a winding portion around which the terminal conductor portion of the coil is wound, and a caulked portion subjected to caulking processing so as to sandwich the terminal conductor portion therein. The caulked portion is configured to be folded back in an axial direction of the tubular portion of the bobbin. The solenoid further includes a magnetic core fixed to an inner periphery of the coil, and a magnetic plunger provided movably closer to the core. The method for manufacturing the solenoid includes a winding step of forming a wound portion by winding the terminal conductor portion of the coil around the winding portion of the terminal, and a caulking step of applying the caulking processing to the terminal and the terminal conductor portion of the coil from the axial direction.

Advantageous Effects of Invention

According to the aspects of the present invention, the present invention can reduce the axial length of the solenoid, thereby increasing the flexibility for mounting onto a vehicle.

DESCRIPTION OF EMBODIMENTS

In the following description, a solenoid, a solenoid valve, and a shock absorber according to an embodiment will be described with reference to the attached drawings citing an example in which they are used for a damping force adjustable hydraulic shock absorber. The attached drawings (FIGS. 1 to 12) are drawings drawn with a level of accuracy equivalent to design drawings.

Figure 1:
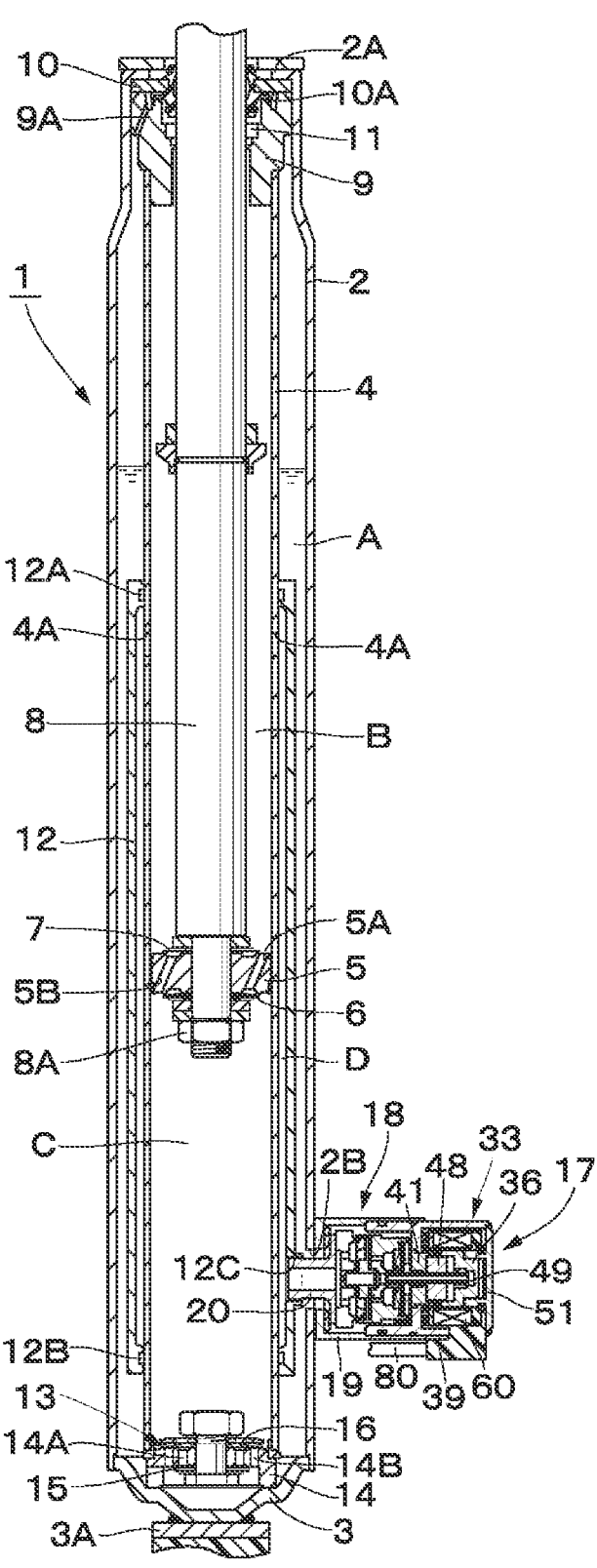
FIG. 1 is a vertical cross-sectional view illustrating a damping force adjustable hydraulic shock absorber including a solenoid according to an embodiment.

FIG. 1 illustrates a damping force adjustable hydraulic shock absorber 1 (a shock absorber) according to the embodiment. In FIG. 1, the damping force adjustable hydraulic shock absorber 1 (hereinafter referred to as the hydraulic shock absorber 1) includes a damping force adjustment mechanism 17 using a solenoid 33 as a driving source. In other words, the hydraulic shock absorber 1 is a shock absorber capable of adjusting a damping force thereof. The hydraulic shock absorber 1 includes an inner tube 4, a piston 5, a piston rod 8, an annular oil chamber D, and the damping force adjustment mechanism 17. The inner tube 4 serves as a cylinder sealingly containing hydraulic fluid therein. The piston 5 is inserted in the inner tube 4, and divides the inside of the inner tube 4 into a one-side chamber and an opposite-side chamber. The piston rod 8 is coupled with the piston 5, and extends out of the inner tube 4. The annular oil chamber D serves as a flow passage in which a flow of the hydraulic fluid is generated due to a movement of the piston rod 8. The damping force adjustment mechanism 17 serves as a solenoid valve in which the opening area of the annular oil chamber D is adjusted by the solenoid 33. More specifically, the hydraulic shock absorber 1 includes an outer tube 2, the inner tube 4, the piston 5, the piston rod 8, a rod guide 9, and the damping force adjustment mechanism 17.

The hydraulic shock absorber 1 includes the bottomed tubular outer tube 2 constituting an outer shell. The lower end side of the outer tube 2 is closed by a bottom cap 3 with use of a welding method or the like. A radially inward bent crimped portion 2A is formed on the upper end side of the outer tube 2. The rod guide 9 and a seal member 10 are provided between the crimped portion 2A and the inner tube 4. On the other hand, an opening 2B is formed on the lower portion side of the outer tube 2 concentrically with a connection port 12C of an intermediate tube 12. The damping force adjustment mechanism 17 is attached on the lower portion side of the outer tube 2 so as to face the opening 2B. A mounting eye 3A, which is attached to, for example, a wheel side of a vehicle, is provided to the bottom cap 3.

The inner tube 4 is provided in the outer tube 2 coaxially with the outer tube 2. The lower end side of the inner tube 4 is attached to a bottom valve 13 by being fitted thereto. The upper end side of the inner tube 4 is attached to the rod guide 9 by being fitted thereto. Oil fluid as the hydraulic fluid (working fluid) is sealingly contained in the inner tube 4 serving as the cylinder. The hydraulic fluid is not limited to oil fluid or oil, and may be, for example, water with an additive mixed therein.

An annular reservoir chamber A is formed between the inner tube 4 and the outer tube 2. Gas is sealingly contained in the reservoir chamber A together with the oil fluid. This gas may be air in an atmospheric-pressure state, or gas such as compressed nitrogen gas may be used as it. The reservoir chamber A compensates for entry and exit of the piston rod 8. An oil hole 4A is pierced radially at an intermediate position of the inner tube 4 in the length direction thereof (the axial direction). The oil hole 4A establishes constant communication of a rod-side oil chamber B with the annular oil chamber D.

The piston 5 is slidably fittedly inserted in the inner tube 4. In other words, the piston 5 is provided slidably in the inner tube 4. The piston 5 divides (partitions) the inside of the inner tube 4 into two chambers, the rod-side chamber B (the one-side chamber) and a bottom-side chamber C (the opposite-side chamber). A plurality of oil passages 5A and a plurality of oil passages 5B are each formed on the piston 5 so as to be circumferentially spaced apart from each other. The oil passages 5A and 5B can establish communication between the rod-side oil chamber B and the bottom-side oil chamber C.

Then, an extension-side disk valve 6 is provided on the lower end surface of the piston 5. The extension-side disk valve 6 is opened upon exceedance of the pressure in the rod-side oil chamber B over a relief setting pressure when the piston 5 is slidably displaced upward during an extension stroke of the piston rod 8, and relieves the pressure at this time to the bottom-side oil chamber C side via each of the oil passages 5A. The relief setting pressure is set to a pressure higher than a valve-opening pressure employed when the damping force adjustment mechanism 17 is set to a hard side.

A compression-side check valve 7 is provided on the upper end surface of the piston 5. The compression-side check valve 7 is opened when the piston 5 is slidably displaced downward during a compression stroke of the piston rod 8, and otherwise is closed. The check valve 7 permits a flow of the oil fluid in the bottom-side oil chamber C through each of the oil passages 5B toward the rod-side oil chamber B, and prohibits a flow of the oil fluid in an opposite direction therefrom. The valve-opening pressure of the check valve 7 is set to a pressure lower than a valve-opening pressure employed when the damping force adjustment mechanism 17 is set to a soft side, and the check valve 7 generates substantially no damping force. Generating substantially no damping force here means a force equal to or weaker than friction on the piston 5 and the seal member 10, and not affecting a motion of the vehicle.

The piston rod 8 extends axially (vertically in FIG. 1) in the inner tube 4. The lower end side of the piston 8 is inserted in the inner tube 4. The piston rod 8 is provided while being fixedly attached to the piston 5 using a nut 8A and the like. The upper end side of the piston rod 8 protrudes out of the outer tube 2 and the inner tube 4 via the rod guide 9. In other words, the piston rod 8 is coupled with the piston 5, and extends out of the inner tube 4. The piston rod 8 may be configured as a so-called double rod by further extending the lower end of the piston rod 8 to cause it to protrude outward from the bottom portion (for example, the bottom cap 3) side.

The stepped cylindrical rod guide 9 is provided on the upper end side of the inner tube 4. The rod guide 9 positions the upper portion of the inner tube 4 at the center of the outer tube 2, and also axially slidably guides the piston rod 8 on the inner peripheral side thereof. The annular seal member 10 is provided between the rod guide 9 and the crimped portion 2A of the outer tube 2. The seal member 10 is formed by, for example, baking an elastic member such as rubber to a metallic circular-ring plate including a hole provided at the center thereof for insertion of the piston rod 8. The seal member 10 seals between the piston rod 8 and the outer tube 2 with the aid of sliding contact of the inner periphery of the elastic material thereof with the outer peripheral side of the piston rod 8.

A lip seal 10A is formed on the seal member 10 on the lower surface side thereof. The lip seal 10A serves as a check valve extending so as to contact the rod guide 9. The lip seal 10A is disposed between an oil pool chamber 11 and the reservoir chamber A. The lip seal 10A permits a flow of the oil fluid and the like in the oil pool chamber 11 toward the reservoir chamber A side via a return passage 9A of the rod guide 9, and prohibits a flow in an opposite direction therefrom.

The intermediate tube 12 made of a tubular member is arranged between the outer tube 2 and the inner tube 4. The intermediate tube 12 is, for example, attached to the outer peripheral side of the inner tube 4 via upper and lower tubular seals 12A and 12B. The intermediate tube 12 forms therein the annular oil chamber D extending so as to surround the outer peripheral side of the inner tube 4 along the entire circumference thereof. The annular oil chamber D is provided as an oil chamber independent of the reservoir chamber A. The annular oil chamber D is in constant communication with the rod-side oil chamber B via the radial oil hole 4A formed through the inner tube 4. The annular oil chamber D serves as a flow passage in which a flow of the hydraulic fluid is generated due to a movement of the piston rod 8. The connection port 12C is provided on the lower end side of the intermediate tube 12. A connection tubular member 20 of a damping force adjustment valve 18 is attached to the connection port 12C.

The bottom valve 13 is provided between the bottom cap 3 and the inner tube 4 at a position on the lower end side of the inner tube 4. The bottom valve 13 includes a valve body 14, a compression-side disk valve 15, and an extension-side check valve 16. The valve body 14 defines (partitions) the reservoir chamber A and the bottom-side oil chamber C between the bottom cap 3 and the inner tube 4. The compression-side disk valve 15 is provided on the lower surface side of the valve body 14. The extension-side check valve 16 is provided on the upper surface side of the valve body 14. Oil passages 14A and 14B are each formed on the valve body 14 so as to be circumferentially spaced apart from each other. The oil passages 14A and 14B can establish communication between the reservoir chamber A and the bottom-side oil chamber C.

The compression-side disk valve 15 is opened upon exceedance of the pressure in the bottom-side oil chamber C over a relief setting pressure when the piston 5 is slidably displaced downward during the compression stroke of the piston rod 8, and relieves the pressure at this time by releasing it to the reservoir chamber A side via each of the oil passages 14A. The relief setting pressure is set to a pressure higher than a valve-opening pressure employed when the damping force adjustment mechanism 17 is set to the hard side.

The extension-side check valve 16 is opened when the piston 5 is slidably displaced upward during the extension stroke of the piston rod 8, and otherwise is closed. The check valve 16 permits a flow of the oil fluid in the reservoir chamber A through each of the oil passages 14B toward the bottom-side oil chamber C, and prohibits a flow of the oil fluid in an opposite direction therefrom. The valve-opening pressure of the check valve 16 is set to a pressure lower than a valve-opening pressure employed when the damping force adjustment mechanism 17 is set to the soft side, and check valve 16 generates substantially no damping force.

Next, the damping force adjustment mechanism 17 for variably adjusting the generated damping force of the hydraulic shock absorber 1 will be described with additional reference to FIG. 2 along with FIG. 1.

The damping force adjustment mechanism 17 constitutes the solenoid valve. The damping force adjustment mechanism 17 is a mechanism that generates the damping force by controlling a flow of the hydraulic fluid generated due to a sliding movement of the piston 5 in the cylinder (the inner tube 4), and also variably adjusts the generated damping force of the hydraulic shock absorber 1. FIG. 2 illustrates the damping force adjustment mechanism 17 with an armature 48 (an actuation pin 49) moved to the left side in FIG. 2 (i.e., a valve-closing direction in which a pilot valve member 32 is seated on a valve seat portion 26E of a pilot body 26) according to power supply to a coil 70 of the solenoid 33 (for example, control of generating a hard damping force) from outside.

As illustrated in FIG. 1, the damping force adjustment mechanism 17 is disposed in such a manner that the proximal end side (the left end side in FIG. 1) thereof is interposed between the reservoir chamber A and the annular oil chamber D, and the distal end side (the right end side in FIG. 1) thereof protrudes radially outward from the lower portion side of the outer tube 2. The damping force adjustment mechanism 17 generates the damping force by controlling the flow of the oil fluid from the annular oil chamber D to the reservoir chamber A with use of the damping force adjustment valve 18. Further, the damping force adjustment mechanism 17 variably adjusts the generated damping force by adjusting the valve-opening pressure of the damping force adjustment valve 18 by the solenoid 33 used as a damping force variable actuator. In this manner, the damping force adjustment mechanism 17 generates the damping force by controlling the flow of the hydraulic fluid (the oil fluid) that is generated according to the sliding movement of the piston 5 in the inner tube 4.

The damping force adjustment mechanism 17 includes the damping force adjustment valve 18 and the solenoid 33. The damping force adjustment valve 18 generates the damping force having the hard or soft characteristic by variably controlling the flow of the oil fluid from the annular oil chamber D to the reservoir chamber A. The solenoid 33 adjusts valve-opening and closing operations of the damping force adjustment valve 18. In other words, the valve-opening pressure of the damping force adjustment valve 18 is adjusted by the solenoid 33 used as the damping force variable actuator, and the generated damping force is variably controlled to the hard or soft characteristic thereby. The damping force adjustment valve 18 is a valve configured in such a manner that the valve-opening and closing operations thereof are adjusted by the solenoid 33, and is provided in a flow passage where the flow of the hydraulic fluid is generated due to the movement of the piston rod 8 (for example, between the annular oil chamber D and the reservoir chamber A).

Then, the damping force adjustment valve 18 includes a generally cylindrical valve case 19, the connection tubular member 20, and a valve member 21. The valve case 19 is provided in such a manner that the proximal end side thereof is fixedly attached to around the opening 2B of the outer tube 2 and the distal end side thereof protrudes radially outward from the outer tube 2. The connection tubular member 20 is provided in such a manner that the proximal end side thereof is fixed to the connection port 12C of the intermediate tube 12, and the distal end side thereof includes an annular flange portion 20A formed thereon and is arranged inside the valve case 19 with a space created therebetween. The valve member 21 is in abutment with the flange portion 20A of this connection tubular member 20.

Figure 2:
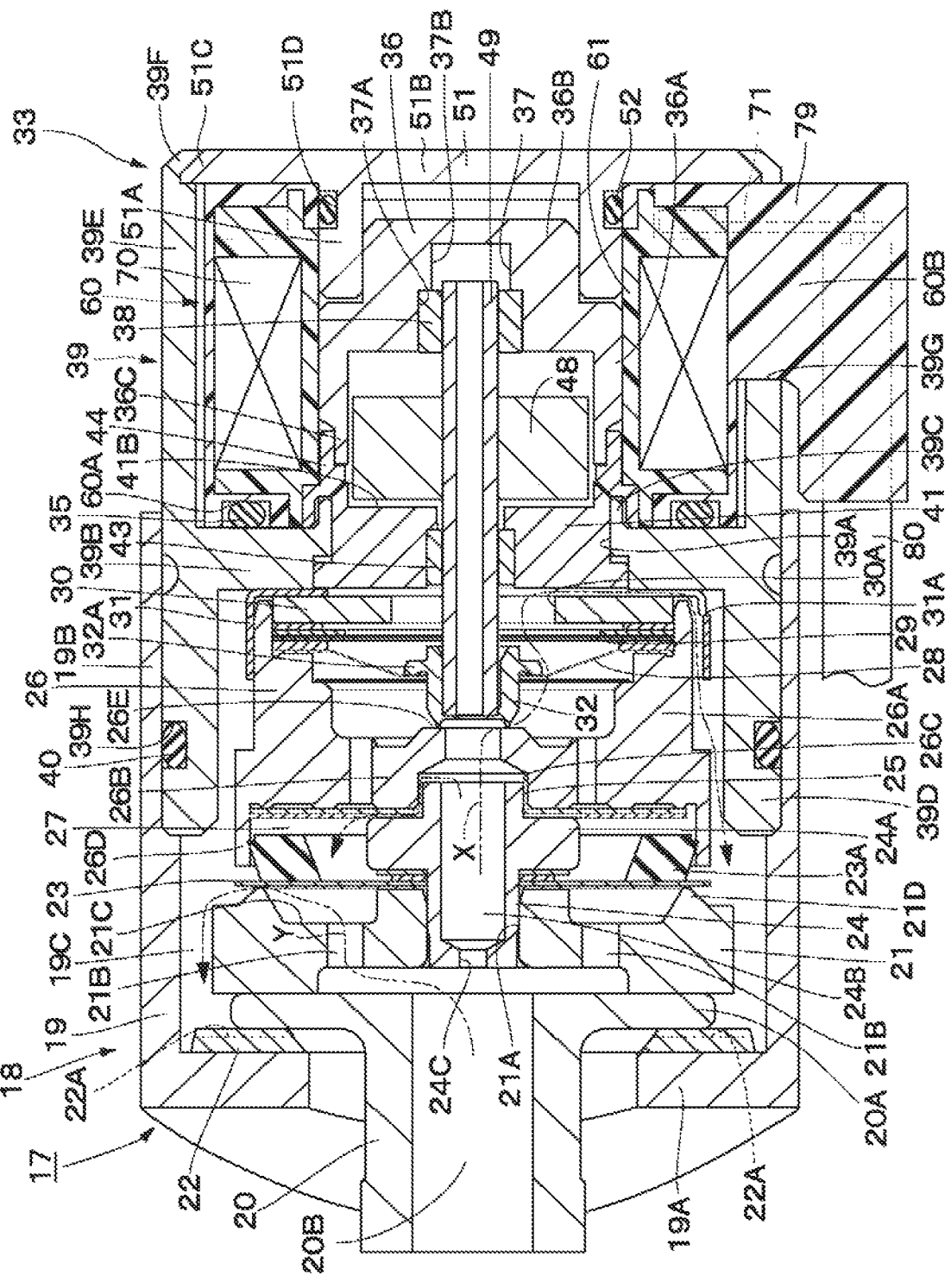
FIG. 2 is a cross-sectional view illustrating a damping force adjustment mechanism in FIG. 1 in an enlarged manner.

As illustrated in FIG. 2, an annular inner flange portion 19A is formed on the proximal end side of the valve case 19. The inner flange portion 19A extends radially inward. A mounting tubular portion 19B is formed on the distal end side of the valve case 19. The mounting tubular portion 19B is used to fix the valve case 19 and a yoke 39 (a one-side tubular portion 39D) of the solenoid 33 by crimping. An annular oil chamber 19C, which is in constant communication with the reservoir chamber A, is defined between the inner peripheral surface of the valve case 19 and the outer peripheral surface of the valve member 21, and further between the inner peripheral surface of the valve case 19 and the outer peripheral surface of the pilot body 26 and the like. The damping force adjustment mechanism 17 may be configured in such a manner that the valve case 19 and the solenoid 33 are joined with each other using a lock nut.

An oil passage 20B is formed inside the connection tubular member 20. The oil passage 20B has one side in communication with the annular oil chamber D and an opposite side extending to the position of the valve member 21. Further, an annular spacer 22 is provided in a sandwiched state between the flange portion 20A of the connection tubular member 20 and the inner flange portion 19A of the valve case 19. A plurality of radially extending cutouts 22A is provided on the spacer 22. The cutouts 22A serve as radial oil passages for establishing communication between the oil chamber 19C and the reservoir chamber A. In the present embodiment, the damping force adjustment mechanism 17 is configured in such a manner that the cutouts 22A for forming the oil passages are provided on the spacer 22. However, cutouts for forming oil passages may be radially provided on the inner flange portion 19A of the valve case 19, instead of the spacer 22. Employing such a configuration allows the spacer 22 to be omitted and contributes to reducing the number of components.

An axially extending central hole 21A is provided on the valve member 21 at the radially central position thereof. Further, a plurality of oil passage 21B is provided on the valve member 21 around the central hole 21A so as to be circumferentially spaced apart from each other. One side (the left side in FIGS. 1 and 2) of each of the oil passages 21B is in constant communication with the oil passage 20B side of the connection tubular member 20. Further, an annular recessed portion 21C and an annular valve seat 21D are provided on the end surface of the valve member 21 on an opposite side thereof (the right side in FIGS. 1 and 2). The annular recessed portion 21C is formed so as to surround the openings of the oil passages 21B on the opposite side. The annular valve seat 21D is located on the radially outer side of this annular recessed portion 21C, and a main valve 23 is seated on and separated from the annular valve seat 21D. Now, each of the oil passages 21B of the valve member 21 serves as a flow passage through which the hydraulic oil flows between the oil passage 20B of the connection tubular member 20 in communication with the annular oil chamber D and the oil chamber 19C of the valve case 19 in communication with the reservoir chamber A at a flow rate according to the valve lift of the main valve 23.

The main valve 23 is constituted by a disk valve sandwiched between the valve member 21 and a large-diameter portion 24A of a pilot pin 24 on the inner peripheral side thereof. The outer peripheral side of the main valve 23 is seated on and separated from the annular valve seat 21D of the valve member 21. An elastic seal member 23A is fixedly attached to the outer peripheral portion of the main valve 23 on the back surface side thereof by a method such as baking. The main valve 23 is opened by receiving a pressure on one side where the oil passage 21B of the valve member 21 is located (the annular oil chamber D side) and being separated from the annular valve seat 21D. As a result, the oil passages 21B of the valve member 21 (the annular oil chamber D side) are brought into communication with the oil chamber 19C (the reservoir chamber A side) via the main valve 23, and the amount (the flow rate) of the hydraulic oil flowing in a direction indicated by an arrow Y at this time is variably adjusted according to the valve lift of the main valve 23.

The pilot pin 24 is formed into a stepped cylindrical shape, and the annular large-diameter portion 24A is provided at an axially intermediate portion thereof. The pilot pin 24 includes an axially extending central hole 24B on the inner peripheral side thereof. A small-diameter hole (an orifice 24C) is formed at one end portion of the central hole 24B (the end portion on the connection tubular member 20 side). One end side (the left end side in FIGS. 1 and 2) of pilot pin 24 is press-fitted in the central hole 21A of the valve member 21, and sandwiches the main disk valve 23 between the large-diameter portion 24A and the valve member 21.

An opposite end side (the right end side in FIGS. 1 and 2) of the pilot pin 24 is fitted in a central hole 26C of the pilot body 26. In this state, axially extending oil passages 25 are formed between the central hole 26C of the pilot body 26 and the opposite end side of the pilot pin 24. These oil passages 25 are in communication with a back-pressure chamber 27 formed between the main valve 23 and the pilot body 26. In other words, the plurality of axially extending oil passages 25 is circumferentially arranged on the side surface of the pilot pin 24 on the opposite end side, and circumferential positions of the pilot pin 24 other than that are press-fitted in the central hole 26C of the pilot body 26.

The pilot body 26 is formed as a generally bottomed tubular member, and includes a cylindrical portion 26A and a bottom portion 26B. The cylindrical portion 26A includes a stepped hole formed inside it. The bottom portion 26B closes the cylindrical portion 26A. The central hole 26C, in which the opposite end side of the pilot pin 24 is fitted, is provided at the bottom portion 26B of the pilot body 26. A protrusion tubular portion 26D is integrally provided on one end side (the left end side in FIGS. 1 and 2) of the bottom portion 26B of the pilot body 26. The protrusion tubular portion 26D is located on the outer-diameter side, and protrudes toward the valve member 21 side along the entire circumference. The elastic seal member 23A of the main valve 23 is liquid-tightly fitted to the inner peripheral surface of the protrusion tubular portion 26D, and the back-pressure chamber 27 is formed between the main valve 23 and the pilot body 26 thereby. The back-pressure chamber 27 generates a pressure (an inner pressure or a pilot pressure) that presses the main valve 23 in a valve-closing direction, i.e., in a direction causing the main valve 23 to be seated onto the annular valve seat 21D of the valve member 21.

A valve seat portion 26E is provided on an opposite end side (the right end side in FIGS. 1 and 2) of the bottom portion 26B of the pilot body 26 so as to surround the central hole 26C. The pilot valve member 32 is seated on and separated from the valve seat portion 26E. Further, a return spring 28, a disk valve 29, a holding plate 30, and the like are arranged inside the cylindrical portion 26A of the pilot body 26. The return spring 28 serves as a biasing member that biases the pilot valve member 32 in a direction away from the valve seat portion 26E of the pilot body 26. The disk valve 29 constitutes a fail-safe valve actuated when the solenoid 33 is in a state that no power is supplied thereto (when the pilot valve member 32 is maximumly separated from the valve seat portion 26E). The holding plate 30 includes an oil passage 30A formed on the central side thereof.

A cap 31 is fittedly fixed at the opening end of the cylindrical portion 26A of the pilot body 26 with the return spring 28, the disk valve 29, the holding plate 30, and the like arranged inside this cylindrical portion 26A. Cutouts 31A are formed on the cap 31 at, for example, positions of four portions circumferentially spaced apart from each other. As indicated by an arrow X in FIG. 2, the cutouts 31A serve as flow passages that allow oil fluid delivered to the solenoid 33 side via the oil passage 30A of the holding plate 30 to flow into the oil chamber 19C (the reservoir chamber A side).

The pilot valve member 32 constitutes the pilot valve (a control valve) together with the pilot body 26. The pilot valve member 32 constitutes a valve body of the damping force adjustment mechanism 17 (a solenoid valve). The pilot valve member 32 is driven by the solenoid 33. The pilot valve member 32 is disposed on the inner periphery of a coil 70. The pilot valve member 32 is formed into a stepped cylindrical shape. The distal end portion of the pilot valve member 32, i.e., the distal end portion seated on and separated from the valve seat portion 26E of the pilot body 26 has a gradually narrowing tapering shape. The actuation pin 49 of the solenoid 33 is fittedly fixed inside the pilot valve member 32, and the valve-opening pressure of the pilot valve member 32 is adjusted according to power supply to this solenoid 33. As a result, the pilot valve (the pilot body 26 and the pilot valve member 32) as the control valve is controlled according to a movement of the actuation pin 49 (i.e., the armature 48) of the solenoid 33. A flange portion 32A, which serves as a spring bearing, is formed on the proximal end side of the pilot valve member 32 along the entire circumference thereof. The flange portion 32A constitutes the fail-safe valve by abutting against the inner peripheral portion of the disk valve 29 when the solenoid 33 is in the state that no power is supplied thereto, i.e., when the pilot valve member 32 is displaced to a fully opened position maximumly separated from the valve seat portion 26E.

Figure 3:
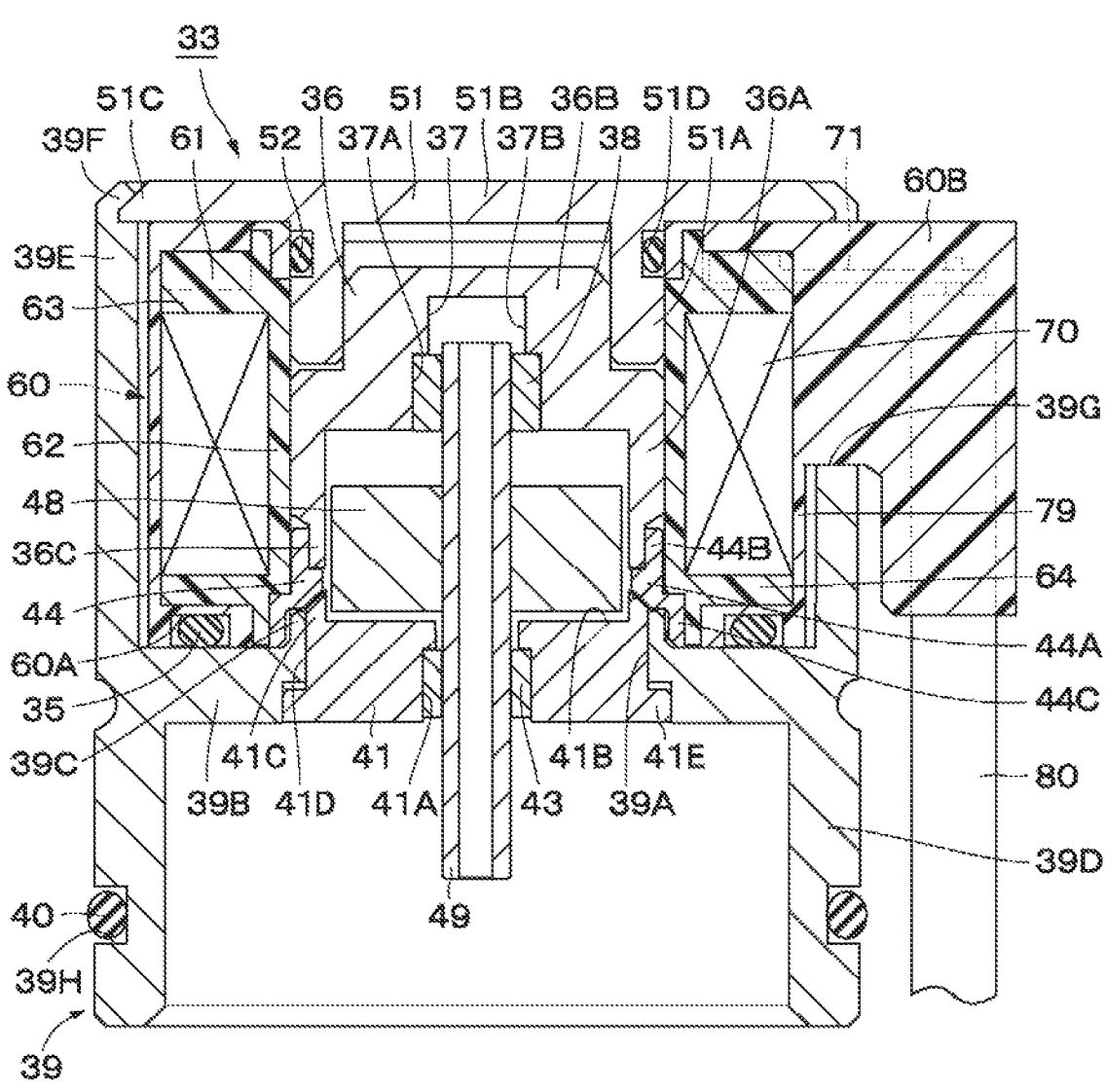
FIG. 3 is a cross-sectional view illustrating a solenoid in FIG. 2 in an enlarged manner.
Figure 11:
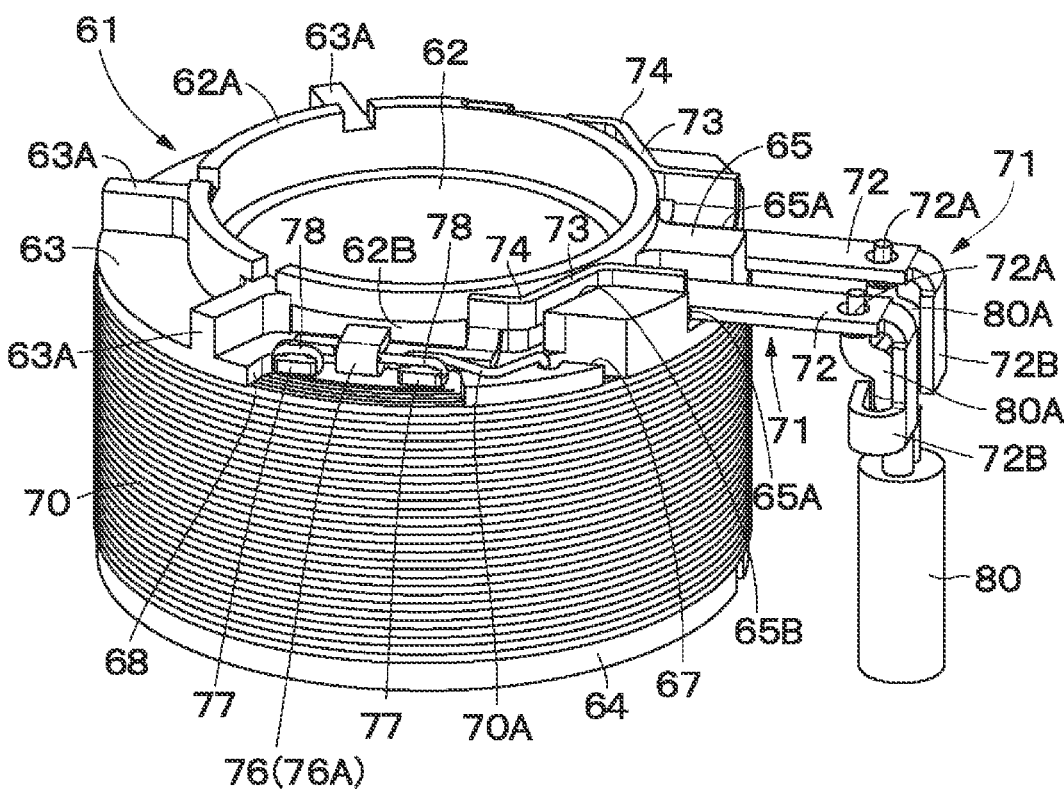
FIG. 11 is a perspective view illustrating a cable connection step.
Figure 12:
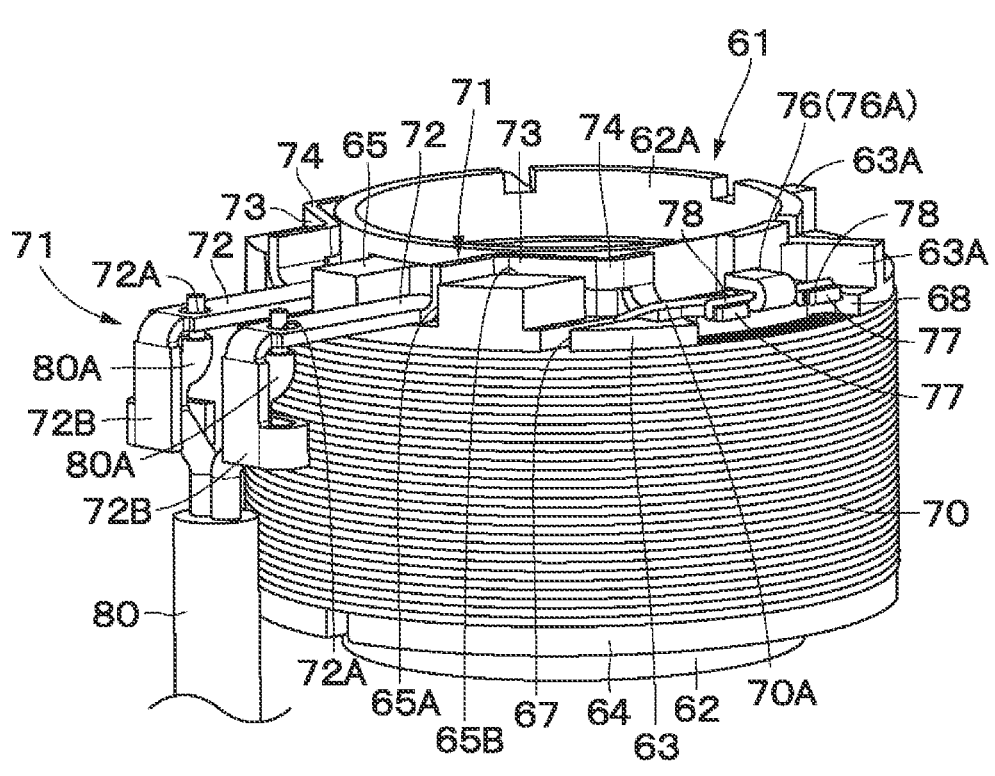
FIG. 12 is a perspective view illustrating the cable connection step as viewed from a direction different from FIG. 11.

Next, the solenoid 33 constituting the damping force adjustment mechanism 17 together with the damping force adjustment valve 18 will be described with additional reference to FIGS. 3, 11, and 12 along with FIGS. 1 and 2. In FIG. 3, the reference numerals are indicated with the right side in FIG. 2 placed on the upper side. In other words, the leftward direction and the rightward direction in FIGS. 1 and 2 correspond to the downward direction and the upward direction in FIGS. 3, 11, and 12, respectively.

The solenoid 33 is built in the damping force adjustment mechanism 17 as the damping force variable actuator of the damping force adjustment mechanism 17. In other words, the solenoid 33 is used in a damping force adjustable shock absorber for the purpose of adjusting the valve-opening and closing operations of the damping force adjustment valve 18. The solenoid 33 includes a molded coil 60, a housing 36 as a housing member, the yoke 39, an anchor 41 as a stator, a cylinder 44 as a joint member (a non-magnetic ring), the armature 48 as a movable element (a movable iron core), the actuation pin 49, and a cover member 51.

The solenoid 33 includes the molded coil 60, the housing 36, the yoke 39, the anchor 41, the cylinder 44, the armature 48, and the actuation pin 49. The molded coil 60 is generally cylindrically formed by winding a coil 70 around a coil bobbin 61 and integrally covering (molding) them with a resin member 79 such as thermosetting resin in this state. An axially or radially outward protruding cable extraction portion 60B is provided at a circumferential part of the molded coil 60, and a cable 80 is connected to this cable extraction portion 60B. The coil 70 of the molded coil 60 is annularly wound around the coil bobbin 61, and becomes an electromagnet and generates a magnetic force in reaction to power supply (energization) from outside via the cable.

A seal groove 60A is formed throughout the entire circumference on an end surface of the resin member 79 of the molded coil 60 that faces the yoke 39 (an annular portion 39B). A seal member (for example, an O-ring 35) is attached in the seal groove 60A. The O-ring 35 liquid-tightly seals between the molded coil 60 and the yoke 39 (the annular portion 39B). Due to this provision, dust containing rainwater or mud water can be prevented from entering a tubular protrusion portion 39C side of the yoke 39 via between the yoke 39 and the molded coil 60.

The coil employed in the present embodiment is not limited to the molded coil 60 including the coil bobbin 61, the coil 70, the terminal 71, and the resin member 79, and another coil may also be employed. For example, the employed coil may be configured in such a manner that a coil is wound around a coil bobbin made from an electrically insulating material, and the outer periphery of the coil is covered with an overmold (not illustrated) formed by molding a resin material over it (on the outer peripheral side) in this state.

The housing 36 constitutes a core (a first fixed iron core) fixed to the inner peripheral side of the molded coil 60 (i.e., the inner periphery of the coil 70). The housing 36 is formed as a lidded cylindrical tubular member from a magnetic material (a magnetic substance) such as low-carbon steel or carbon steel for machine structural use (S10C). The housing 36 includes a housing tubular portion 36A as a housing portion, a stepped lid portion 36B, and the small-diameter tubular portion 36C for joining. The housing tubular portion 36A extends in a direction of a winding axis of the molded coil 60 (the coil 70), and has an opening on one end side thereof (the left side in FIG. 2 and the lower side in FIG. 3). The lid portion 36B closes an opposite end side (the right side in FIG. 2 and the upper side in FIG. 3) of the housing tubular portion 36A. The small-diameter tubular portion 36C is formed by reducing the diameter of the outer periphery of the housing tubular portion 36A on the opening side (one side) thereof.

The inner periphery of the cylinder 44 is joined with the outer periphery of the small-diameter tubular portion 36C of the housing 36 by brazing. The housing tubular portion 36A of the housing 36 is formed in such a manner that the inner diameter dimension thereof is slightly larger than the outer diameter dimension of the armature 48, and the armature 48 is axially movably housed in the housing tubular portion 36A.

The lid portion 36B of the housing 36 is integrally formed on the housing tubular portion 36A as a lidded tubular member that closes the housing tubular portion 36A from the opposite axial side. The lid portion 36B has a stepped shape smaller in outer diameter than the outer diameter of the housing tubular portion 36A, and a fitted tubular portion 51A of the cover member 51 is fittedly placed on the outer peripheral side of the lid portion 36B. Further, a bottomed stepped hole 37 is formed in the housing 36 at a position inside the lid portion 36B. The stepped hole 37 includes a bush attachment hole portion 37A and a small-diameter hole portion 37B. The small-diameter hole portion 37B is located on a deeper side and formed to have a smaller diameter than the bush attachment hole portion 37A. A first bush 38 is provided in the bush attachment hole portion 37A. The first bush 38 is used to slidably support the actuation pin 49.

Further, the end surface of the lid portion 36B of the housing 36 on the opposite side thereof is disposed so as to face a cover plate 51B of the cover member 51 with an axial space created therebetween. This axial space has a function of preventing an axial force from being directly applied from the opposite side where the cover plate 51B of the cover member 51 is located to the housing 36 via the lid portion 36B. The lid portion 36B of the housing 36 does not necessarily have to be formed integrally with the housing tubular portion 36A using the same material (magnetic substance). The lid portion 36B in this case can also be made from, for example, a rigid metal material, a ceramic material, or a fiber-reinforced resin material, instead of the magnetic material.

The yoke 39 is a magnetic member that generates a magnetic circuit (a magnetic path) throughout the inner peripheral side and the outer peripheral side of the molded coil 60 (the coil 70) together with the housing 36. The yoke 39 includes the annular portion 39B and the tubular protrusion portion 39C. The annular portion 39B is formed using a magnetic material (a magnetic substance) similarly to the housing 36, and radially extends on the one axial side of the molded coil 60 (the coil 70) (one side in the direction of the winding axis) and includes a stepped fixation hole 39A on the inner peripheral side thereof. The tubular protrusion portion 39C protrudes tubularly along the axial direction of the fixation hole 39A from the inner peripheral side of the annular portion 39B toward the opposite axial side (toward the coil 70 side).

Further, the yoke 39 is formed as an integrated member including the cylindrical one-side tubular portion 39D, an opposite-side tubular portion 39E, and a crimped portion 39F. The one-side tubular portion 39D extends from the outer peripheral side of the annular portion 39B toward the one axial side (the damping force adjustment valve 18 side). The opposite-side tubular portion 39E extends from the outer peripheral side of the annular portion 39B toward the opposite axial side (the cover member 51 side), and is formed so as to surround the molded coil 60 from the radially outer side. The crimped portion 39F is provided on the distal end side of the opposite-side tubular portion 39E, and holds a flange portion 51C of the cover member 51 in a retained state. A cutout 39G is provided at the opposite-side tubular portion 39E of the yoke 39. The cutout 39G is used to expose the cable extraction portion 60B of the molded coil 60 to outside the opposite-side tubular portion 39E.

A seal groove 39H is provided on the outer peripheral surface of the one-side tubular portion 39D of the yoke 39 along the entire circumference. An O-ring 40 (refer to FIG. 2) as a seal member is attached in the seal groove 39H. The O-ring 40 liquid-tightly seals between the yoke 39 (the one-side tubular portion 39D) and the valve case 19 of the damping force adjustment valve 18.

The anchor 41 is a second fixed iron core (the stator) fixed in the fixation hole 39A of the yoke 39 using a method such as press-fitting. The anchor 41 is made from a magnetic material (a magnetic substance) such as low-carbon steel or carbon steel for machine structural use (S10C) similarly to the housing 36 (the first fixed iron core) and the yoke 39, and is formed into a shape filling the fixation hole 39A of the yoke 39 from inside. The anchor 41 is formed as a short cylindrical annular member having an axially extending through-hole 41A on the central side thereof. The surface of the anchor 41 on the one axial side (the surface that axially faces the cap 31 of the damping force adjustment valve 18 illustrated in FIG. 2) is formed so as to be a flat surface similarly to the surface of the annular portion 39B of the yoke 39 on the one side.

A circular recessed dented portion 41B is provided in a recessed manner on an opposite axial side of the anchor 41 (the surface on the opposite side that axially faces the armature 48) coaxially with the housing tubular portion 36A. The recessed dented portion 41B is formed as a circular groove slightly larger in diameter than the armature 48 so as to allow the armature 48 to be inserted inside it advanceably and retractably under a magnetic force. Accordingly, a cylindrical protrusion portion 41C is provided on the opposite side of the anchor 41. The outer peripheral surface of the protrusion portion 41C on the opening side thereof is formed as a conical surface so as to establish a linear (straight-line) magnetic characteristic between the anchor 41 and the armature 48.

In other words, the protrusion portion 41C, which is also called a corner portion, tubularly protrudes from the outer peripheral side of the anchor 41 to the opposite axial side. Then, the outer peripheral surface (the outer peripheral surface on the opening side) of the protrusion portion 41C is shaped like a conical surface inclined in a tapering manner so as to have an outer diameter dimension gradually reducing toward the opposite axial side (the opening side). In other words, the protrusion portion 41C of the anchor 41 is formed as a reduced diameter portion provided at a position that faces the opening of the housing 36 (the housing tubular portion 36A) and having an outer diameter reducing as it becomes closer to the opening of the housing tubular portion 36A.

Further, aside surface portion 41D is formed on the outer peripheral side of the anchor 41. The side surface portion 41D extends in a direction away from the opening of the housing tubular portion 36A of the housing 36 along the outer periphery of the protrusion portion 41C. A radially outward protruding annular flange portion 41E is formed at an end portion of this side surface portion 41D on the one side farther away from the opening. The annular flange portion 41E is disposed at a position largely separated from the opening end of the housing tubular portion 36A of the housing 36 to the one axial side (i.e., the end portion opposite from the recessed dented portion 41B).

The annular flange portion 41E is, for example, fixed in the fixation hole 39A of the yoke 39 using a method such as press-fitting. The annular flange portion 41E serves as a fixed portion of the anchor 41 (the side surface portion 41D) to the fixation hole 39A of the yoke 39, and also serves as a portion where the flange portion 41E and the fixation hole 39A radially face each other.

The anchor 41 includes the protrusion portion 41C and the side surface portion 41D formed integrally from a magnetic material. The anchor 41 is provided at a position that faces the opening of the housing tubular portion 36A of the housing 36. The protrusion portion 41C protrudes toward the opening of the housing tubular portion 36A of the housing 36. The side surface portion 41D extends from the outer periphery of the protrusion portion 41C in the direction away from the opening of the housing tubular portion 36A of the housing 36.

As illustrated in FIG. 3, a second bush 43 is fittedly provided in the stepped through-hole 41A formed on the central (inner peripheral) side of the anchor 41. The second bush 43 is used to slidably support the actuation pin 49. On the other hand, as illustrated in FIG. 2, the pilot body 26, the return spring 28, the disk valve 29, the holding plate 30, the cap 31, and the like of the damping force adjustment valve 18 are placed by being inserted on the inner peripheral side of the one-side tubular portion 39D of the yoke 39. Further, the valve case 19 of the damping force adjustment valve 18 is fitted (externally fitted) to the outer peripheral side of the one-side tubular portion 39D.

The cylinder 44 is a non-magnetic connection member provided on the inner peripheral side of the molded coil 60 (the coil 70) at a position between the small-diameter tubular portion 36C of the housing 36 and the tubular protrusion portion 39C of the yoke 39. The cylinder 44 is formed as a stepped cylindrical member from a non-magnetic material such as austenitic stainless steel. The cylinder 44 includes an axially intermediate stepped tubular portion 44A, and first and second connection tubular portions 44B and 44C. The first and second connection tubular portions 44B and 44C protrude axially from the both ends of the stepped tubular portion 44A, respectively.

Now, the cylinder 44 is formed in such a manner that the second connection tubular portion 44C has a larger radial dimension than the first connection tubular portion 44B by, for example, an amount corresponding to the thickness of the connection tubular portion 44B. Then, the first and second connection tubular portions 44B and 44C are molded so as to each have a desired thickness (a radial thickness) using the non-magnetic material so as to be able to achieve desired coaxiality together with the stepped tubular portion 44A. The first connection tubular portion 44B of the cylinder 44 is fitted to the small-diameter tubular portion 36C of the housing 36 from outside, and they are joined with each other by brazing. Further, the second connection tubular portion 44C is fitted to the outer peripheral side of the tubular protrusion portion 39C of the yoke 39, and they are joined with each other by brazing.

The solenoid 33 may be configured in such a manner that the cylinder 44 and the housing 36 are joined and/or the cylinder 44 and the yoke 39 are joined with each other by being heated using a joining method different from the brazing (for example, a joining method using welding such as laser welding). In other words, the housing 36 and the cylinder 44, and the cylinder 44 and the yoke 39 may be joined with each other by welding.

The armature 48 is a movable element made from a magnetic material provided movably in the direction of the winding axis of the coil 70 between the housing tubular portion 36A of the housing 36 and the recessed dented portion 41B of the anchor 41. The armature 48 and the actuation pin 49 constitute a plunger provided movably closer to the housing 36 (the core). The armature 48 is arranged on the radially inner sides of the housing tubular portion 36A of the housing 36, the protrusion portion 41C of the anchor 41, the tubular protrusion portion 39C of the yoke 39, and the cylinder 44, and is configured axially movably between the housing tubular portion 36A of the housing 36 and the recessed dented portion 41B of the anchor 41. In other words, the armature 48 is arranged on the inner peripheral sides of the housing tubular portion 36A of the housing 36 and the recessed dented portion 41B of the anchor 41, and is configured axially movably via the first and second bushes 38 and 43 and the actuation pin 49 under the magnetic force generated on the coil 70.

The armature 48 is provided fixedly (integrally) to the actuation pin 49 extending through the central side thereof, and moves together with the actuation pin 49. The actuation pin 49 is axially slidably supported on the lid portion 36B of the housing 36 and the anchor 41 via the first and second bushes 38 and 43. Now, the armature 48 is generally cylindrically formed using a ferrous magnetic material similarly to, for example, the housing 36, the yoke 39, and the anchor 41. Then, a thrust force is generated on the armature 48 in a direction for attracting the armature 48 toward inside the recessed dented portion 41B of the anchor 41 under the magnetic force generated on the coil 70.

The actuation pin 49 is a shaft portion that transmits the thrust force of the armature 48 to the pilot valve member 32 of the damping force adjustment valve 18 (the control valve), and is made of a hollow rod. The armature 48 is integrally fixed at an axially intermediate portion of the actuation pin 49 using a method such as press-fitting, and the armature 48 and the actuation pin 49 are sub-assembled by that. The both axial sides of the actuation pin 49 are slidably supported on the lid portion 36B of the housing 36 side and the yoke 39 (the anchor 41) via the first and second bushes 38 and 43.

One end side (the end portion on the left side in FIG. 2 and the end portion on the lower side in FIG. 3) of the actuation pin 49 protrudes axially from the anchor 41 (the yoke 39), and, along therewith, the pilot valve member 32 of the damping force adjustment valve 18 is fixed to this protruding end. Therefore, the pilot valve member 32 moves axially integrally together with the armature 48 and the actuation pin 49. In other words, the valve-opening setting pressure of the pilot valve member 32 is set to a pressure value corresponding to the thrust force of the armature 48 based on power supply to the coil 70. The armature 48 opens and closes the pilot valve of the hydraulic shock absorber 1 (i.e., opens and closes the pilot valve member 32 from and to the pilot body 26) by axially moving under the magnetic force from the coil 70.

The cover member 51 is a magnetic cover that covers the molded coil 60 from outside together with the opposite-side tubular portion 39E of the yoke 39. This cover member 51 is made from a magnetic material (a magnetic substance) as the cover member that covers the molded coil 60 from the opposite axial side, and generates a magnetic circuit (a magnetic path) outside the molded coil 60 (the coil 70) together with the opposite-side tubular portion 39E of the yoke 39. The cover member 51 is generally formed into a covered tubular shape, and generally includes the cylindrical fitted tubular portion 51A and the cover plate 51B shaped like a circular plate, which closes the opposite end side (the end portion on the right side in FIG. 2 and the end portion on the upper side in FIG. 3) of the fitted tubular portion 51A.

Then, the fitted tubular portion 51A of the cover member 51 is configured to be fittedly inserted to outside the lid portion 36B of the housing 36 and contain the lid portion 36B of the housing 36 inside it in this state. On the other hand, the annular flange portion 51C extending to the radially outer side of the fitted tubular portion 51A is formed on the outer peripheral side of the cover plate 51B of the cover member 51, and the outer peripheral edge of the flange portion 51C is fixed to the crimped portion 39F provided on the opposite-side tubular portion 39E of the yoke 39. Due to this configuration, the opposite-side tubular portion 39E of the yoke 39 and the cover plate 51B of the cover member 51 are preliminarily assembled (sub-assembled) with the molded coil 60 built inside them as illustrated in FIG. 3.

In this manner, the lid portion 36B of the housing 36 is fittedly attached in the fitted tubular portion 51A of the cover member 51 in the state that the molded coil 60 is built inside the opposite-side tubular portion 39E of the yoke 39 and the cover plate 51B of the cover member 51. Due to this configuration, a magnetic flux can be transferred between the fitted tubular portion 51A and the cover plate 51B of the cover member 51 and the yoke 39. Further, a seal groove 51D is formed on the fitted tubular portion 51A of the cover member 51 throughout the entire circumference on the outer peripheral side to which the resin member 79 of the molded coil 60 is fitted. A seal member (for example, an O-ring 52) is attached in this seal groove 51D. The O-ring 52 liquid-tightly seals between the molded coil 60 and the cover member 51 (the fitted tubular portion 51A). As a result, dust containing rainwater or mud water can be prevented from entering between the housing 36 and the molded coil 60 and further entering, for example, between the housing 36 and the cover member 51 via between the cover member 51 and the molded coil 60.

Next, the molded coil 60 constituting the solenoid 33 will be described with additional reference to FIGS. 11 and 12 along with FIG. 3.

The molded coil 60 includes the bobbin 61, the coil 70, and the terminal 71. The coil bobbin 61 includes a tubular portion 62 and a first flange portion 63 formed at one axial end (the upper end in FIGS. 3 and 11) of the tubular portion 62. In addition thereto, the coil bobbin 61 includes a second flange portion 64 formed at an opposite axial end (the lower end in FIGS. 3 and 11) of the tubular portion 62. The tubular portion 62 is cylindrically formed, and is configured to be able to contain the housing 36 therein.

The first flange portion 63 constitutes a large-diameter portion extending radially to outside the tubular portion 62. The first flange portion 63 is formed into a disk-like shape larger in radial dimension than the tubular portion 62. The second flange portion 64 also extends radially to outside the tubular portion 62, similarly to the first flange portion 63.

A protrusion cylindrical portion 62A is disposed at the central portion of the first flange portion 63. The protrusion cylindrical portion 62A constitutes a one-end portion of the tubular portion 62. Three ribs 63A are formed on the end surface of the first flange portion 63. The ribs 63A extend from the protrusion cylindrical portion 62A radially outward. A recessed portion 62B is formed on the tubular portion 62 (the protrusion cylindrical portion 62A) of the coil bobbin 61. The recessed portion 62B allows the terminal 71 to be deformed (depressed) in the inner-diameter direction with respect to the outer diameter of the tubular portion 62. More specifically, the recessed portion 62B is disposed at a portion of the protrusion cylindrical portion 62A that corresponds to a cutout portion 68, and is recessed radially inward. When bending processing is applied to an arm portion 75 of the terminal 71 and the like radially inward, a part of the arm portion 75 is inserted into the recessed portion 62B.

A mounting portion 65 is formed on the end surface of the first flange portion 63 at a position different from the three ribs 63A. More specifically, the mounting portion 65 is disposed radially opposite of the tubular portion 62 from one of the three ribs 63A that is located at the circumferentially intermediate position. The mounting portion 65 extends from the protrusion cylindrical portion 62A radially outward, and also has a thickness dimension greater than the first flange portion 63. Two containing recessed portions 65A are formed on the mounting portion 65. The containing recessed portions 65A are each constituted by a recessed dented groove that linearly extends from the protrusion cylindrical portion 62A radially outward. The protrusion cylindrical portion 62A is disposed at the inner-diameter ends of the containing recessed portions 65A. The outer-diameter ends of the containing recessed portions 65A are opened. The two containing recessed portions 65A are disposed in parallel with each other. An extension portion 72 of the terminal 71 is contained in each of the containing recessed portions 65A. Further, a guide groove 65B is formed on the mounting portion 65. The guide groove 65B extends from each of the inner-diameter ends of the containing recessed portions 65A toward the circumferentially outer side of the mounting portion 65. The guide groove 65B linearly extends. A connection portion 73 of the terminal 71 is inserted in the guide groove 65B.

A support portion 66 is formed on the coil bobbin 61. The support portion 66 is in abutment with a curved portion 74 of the terminal 71. The support portion 66 is disposed between the guide groove 65B and the protrusion cylindrical portion 62A. The support portion 66 is triangularly shaped when the coil bobbin 61 is planarly viewed from the one axial side. The support portion 66 supports the connection portion 73 of the terminal 71 when the bending processing is applied to the terminal 71. In other words, the support portion 66 serves as a pivot point of the terminal 71 when the curved portion 74 is formed by applying the bending processing to the terminal 71. Therefore, the curved portion 74, which is formed by curving the connection portion 73, is defined at a position of the terminal 71 in contact with the support portion 66.

Two conductor extraction portions 67 are formed on the first flange portion 63 at positions near the mounting portion 65. The two conductor extraction portions 67 are disposed on the both sides of the mounting portion 65 in the circumferential direction of the first flange portion 63. Each of the conductor extraction portions 67 is constituted by a cutout groove extending through the first flange portion 63 in the thickness direction, and extends to the outer peripheral end of the first flange portion 63. A terminal conductor portion 70A of the coil 70 is extracted out to the end surface side (the protrusion cylindrical portion 62A side) of the first flange portion 63 by passing through the conductor extraction portion 67.

The cutout portion 68 is formed on the first flange portion 63 of the coil bobbin 61. The cutout portion 68 is cut out in the axial direction and the radial direction of the tubular portion 62. The cutout portion 68 is disposed on each of the both sides of the tubular portion 62 in the radial direction of the first flange portion 63. This means that two cutout portions 68 are formed on the first flange portion 63. Each of the cutout portions 68 is located between the mounting portion 65 and the rib 63A in the circumferential direction of the first flange portion 63. The cutout portion 68 is rectangularly shaped when the coil bobbin 61 is planarly viewed from the one axial side, and extends through the first flange portion 63 in the thickness direction. A wound portion 78 of the terminal 71 is disposed in the cutout portion 68. The cutout portion 68 is subjected to molding processing using resin.

A protrusion portion 69 is formed on one end surface of the first flange portion 63 of the coil bobbin 61. The protrusion portion 69 protrudes so as to abut against the terminal 71. The protrusion portion 69 is disposed between the cutout portion 68 and the protrusion cylindrical portion 62A. The protrusion portion 69 is disposed on each of the both sides of the tubular portion 62 in the radial direction of the first flange portion 63. This means that two protrusion portions 69 are formed on the first flange portion 63.

Each of the protrusion portions 69 is constituted by, for example, a circular protrusion. The protrusion portion 69 protrudes from the end surface of the first flange portion 63 toward the arm portion 75 of the terminal 71. The protrusion portion 69 is inserted in an engagement recessed portion 75A of the arm portion 75. Due to this configuration, the protrusion portion 69 is engaged with the engagement recessed portion 75A of the arm portion 75, and prevents the arm portion 75 (a winding portion 77) of the terminal 71 from being displaced radially outward beyond the protrusion cylindrical portion 62A.

The coil 70 is made of, for example, a conductor coated with an insulation coating such as an enameled wire. The coil 70 is wound around the coil bobbin 61. More specifically, the coil 70 is wound around the tubular portion 62 at a position between the first flange portion 63 and the second flange portion 64. The terminal conductor portions 70A located on the both ends of the coil 70 are each joined with the terminal 71.

The terminal 71 includes the extension portion 72, the connection portion 73, the curved portion 74, the arm portion 75, the joint portion 76, and the winding portion 77. The terminal 71 is formed by, for example, stamping a plate-shaped conductive metal material. Two terminals 71 are attached to the first flange portion 63. The two terminals 71 are shaped symmetrically with respect to the tubular portion 62. Each of the terminals 71 establishes an electric connection between the coil 70 and a core wire 80A of the cable 80. The terminal 71 connects the terminal conductor portion 70A of the coil 70 and the cable 80. The terminal 71 includes the joint portion 76 that joins the terminal conductor portion 70A of the coil 70. The joint portion 76 extends in a direction along one end surface of the first flange portion 63 of the coil bobbin 61.

The extension portion 72 is formed into a rectangular flat plate-like shape, and is attached to the containing recessed portion 65A of the mounting portion 65. The proximal end side of the extension portion 72 is disposed at a position near the protrusion cylindrical portion 62A. The distal end side of the extension portion 72 protrudes from the containing recessed portion 65A radially outward. A circular through-hole 72A is formed at the distal end side of the extension portion 72. The core wire 80A of the cable 80 is inserted in the through-hole 72A, and is joined with the extension portion 72 using, for example, soldering. A core wire support portion 72B is formed on the extension portion 72 at a position on the distal end side with respect to the through-hole 72A. The core wire support portion 72B is formed into an L-like shape using a small piece located at the distal end of the extension portion 72 and extending in the width direction. The core wire support portion 72B holds the core wire 80A of the cable 80 by enveloping it. The distal end side of the extension portion 72 is bent, by which the core wire support portion 72B extends axially toward the second flange portion 64 side.

The connection portion 73 extends from the proximal end of the extension portion 72 toward the cutout portion 68 in the circumferential direction of the tubular portion 62. The connection portion 73 is inserted in the guide groove 65B of the mounting portion 65. The connection portion 73 is formed into an elongated band-like shape. The proximal end of the connection portion 73 is connected to the extension portion 72. The distal end of the connection portion 73 is connected to the arm portion 75. Accordingly, the connection portion 73 connects the extension portion 72 and the arm portion 75. The curved portion 74 is formed on an intermediate portion of the connection portion 73. The curved portion 74 faces the support portion 66, and is curved in a circular-arc shape. The curved portion 74 causes the arm portion 75 to be located radially inside the coil bobbin 61.

The arm portion 75 is shaped like a linearly extending elongated flat plate. The proximal end side of the arm portion 75 is connected to the distal end of the connection portion 73. The joint portion 76 is provided at an intermediate position of the arm portion 75 in the length direction while being located on the radially outer side. The joint portion 76 joins the terminal 71 and the terminal conductor portion 70A of the coil 70. The joint portion 76 includes a caulked portion 76A (a fused portion) subjected to caulking processing. More specifically, the joint portion 76 is formed from an elongated small piece extending from the arm portion 75 radially outward. The joint portion 76 is formed by folding back the small piece toward the opposite side from the first flange portion 63 in the axial direction. For example, thermal caulking is applied to the joint portion 76 with the joint portion 76 sandwiching the terminal conductor portion 70A of the coil 70 therein. As a result, the joint portion 76 forms the caulked portion 76A electrically joined with the terminal conductor portion 70A of the coil 70. At this time, the caulked portion 76A is subjected to the caulking processing so as to be folded back in the axial direction of the tubular portion 62 of the coil bobbin 61 and sandwich the terminal conductor portion 70A of the coil 70 therein.

The caulked portion 76A is not limited to the thermal caulking. The caulked portion 76A may be formed by mechanical caulking or crimping processing as long as it can electrically connect the terminal conductor portion 70A and the terminal 71. Alternatively, the joint portion 76 may be formed using another joining method such as soldering processing without being limited to the caulking processing, as long as the joint portion 76 can electrically connect the terminal conductor portion 70A and the terminal 71.

Two winding portions 77 are provided on the arm portion 75 at positions on the radially outer side. The winding portions 77 are formed from T-shaped small pieces extending from the arm portion 75 radially outward. One of the winding portions 77 is disposed on the proximal end side of the arm portion 75. The other of the winding portions 77 is disposed on the distal end side of the arm portion 75. Therefore, the joint portion 76 is located at an intermediate position between the two winding portions 77 in the length direction of the arm portion 75 as the position interposed between the two winding portions 77. Each of the winding portions 77 is a bundling portion, and the terminal conductor portion 70A of the coil 70 is bundled thereby. In other words, the terminal conductor portion 70A of the coil 70 is wound around the winding portion 77. Due to that, the winding portion 77 supports the terminal conductor portion 70A so as to bring the terminal conductor portion 70A of the coil 70 into an undisplaceable state at the position of the joint portion 76. At this time, the portion where the terminal conductor portion 70A is wound around the winding portion 77 becomes the wound portion 78. The winding portion 77 and the arm portion 75 extending from the winding portion 77 extend together with the joint portion 76 in a direction in which the joint portion 76 is disposed along the one end surface of the first flange portion 63 of the coil bobbin 61. The arm portion 75 of the terminal 71 extends in a direction perpendicular to the diameter of the coil bobbin 61. In other words, the arm portion 75 of the terminal 71 is disposed in the cutout portion 68 of the first flange portion 63 in a state of extending in the tangential direction of the tubular portion 62. As a result, the winding portion 77 of the terminal 71 is disposed so as to be located inside the first flange portion 63 of the coil bobbin 61.

The resin member 79 integrally covers the coil 70 and the coil bobbin 61 with the coil 70 wound around the coil bobbin 61. The resin member 79 is made from a resin material such as thermosetting resin for example. The resin member 79 is formed by molding the resin material with the coil bobbin 61 and the coil 70 surrounded therein.

The axially or radially outward protruding cable extraction portion 60B is provided at a circumferential part of the molded coil 60. The cable 80 as an external electric wire is connected to the cable extraction portion 60B. The two core wires 80A of the cable 80 are joined with the two terminals 71, respectively. The coil 70 of the molded coil 60 is annularly wound around the coil bobbin 61, and becomes an electromagnet and generates a magnetic force in reaction to power supply (energization) from outside via the cable 80.

Next, a method for manufacturing the solenoid 33 will be described with reference to FIGS. 3 to 12.

Figure 4:
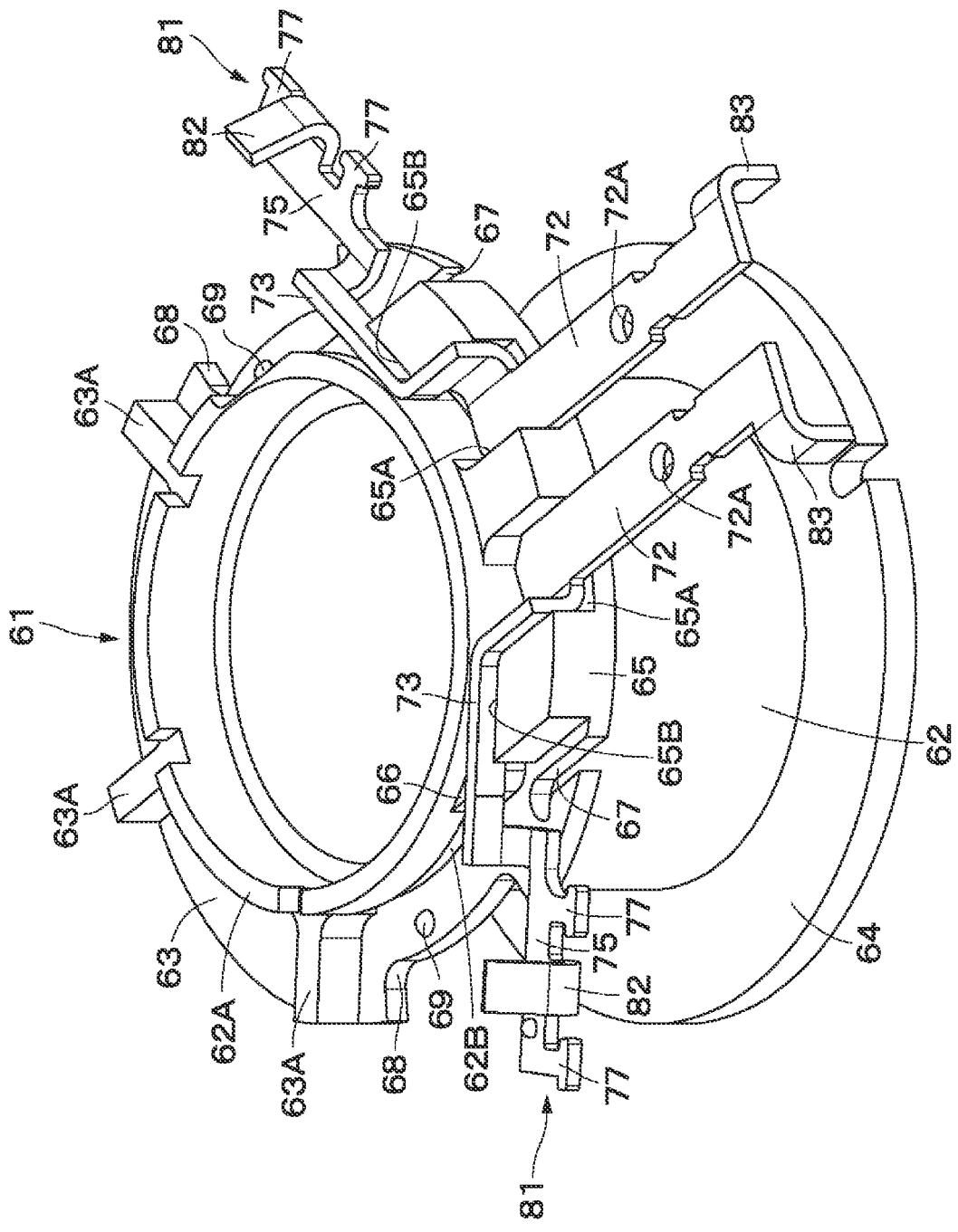
FIG. 4 is a perspective view illustrating the solenoid with a terminal before bending processing attached to a coil bobbin.

As illustrated in FIG. 4, two unprocessed terminals 81 are attached to the coil bobbin 61. At this time, each of the terminals 81 is in a state before the bending processing. Therefore, the unprocessed terminal 81 does not include the curved portion 74, and is in a state that the connection portion 73 thereof linearly extends. Further, a joint portion 82 is in a state before the caulking processing. Therefore, the small piece of the joint portion 82 protrudes in a state of being bent from the arm portion 75 in an L-shape manner. At this time, the distal end of the small piece of the joint portion 82 is in a state of being separated from the arm portion 75. Further, a core wire support portion 83 of the extension portion 72 is in a state before the cable connection. Therefore, the core wire support portion 83 of the extension portion 72 linearly extends from the extension portion 72 radially outward. Further, the distal end of the small piece of the core wire support portion 83 is disposed at a position separated from the extension portion 72. Accordingly, the core wire support portion 83 is in an opened state. Except for them, the unprocessed terminal 81 is the same as the processed terminal 71.

When the terminal 81 is attached to the coil bobbin 61, the extension portion 72 of the terminal 81 is contained in the containing recessed portion 65A of the first flange portion 63. In addition thereto, the connection portion 73 of the terminal 81 is inserted in the guide groove 65B of the first flange portion 63. At this time, the arm portion 75, the joint portion 82, and the winding portions 77 of the terminal 81 are in a state protruding radially outward beyond the first flange portion 63.

Figure 5:
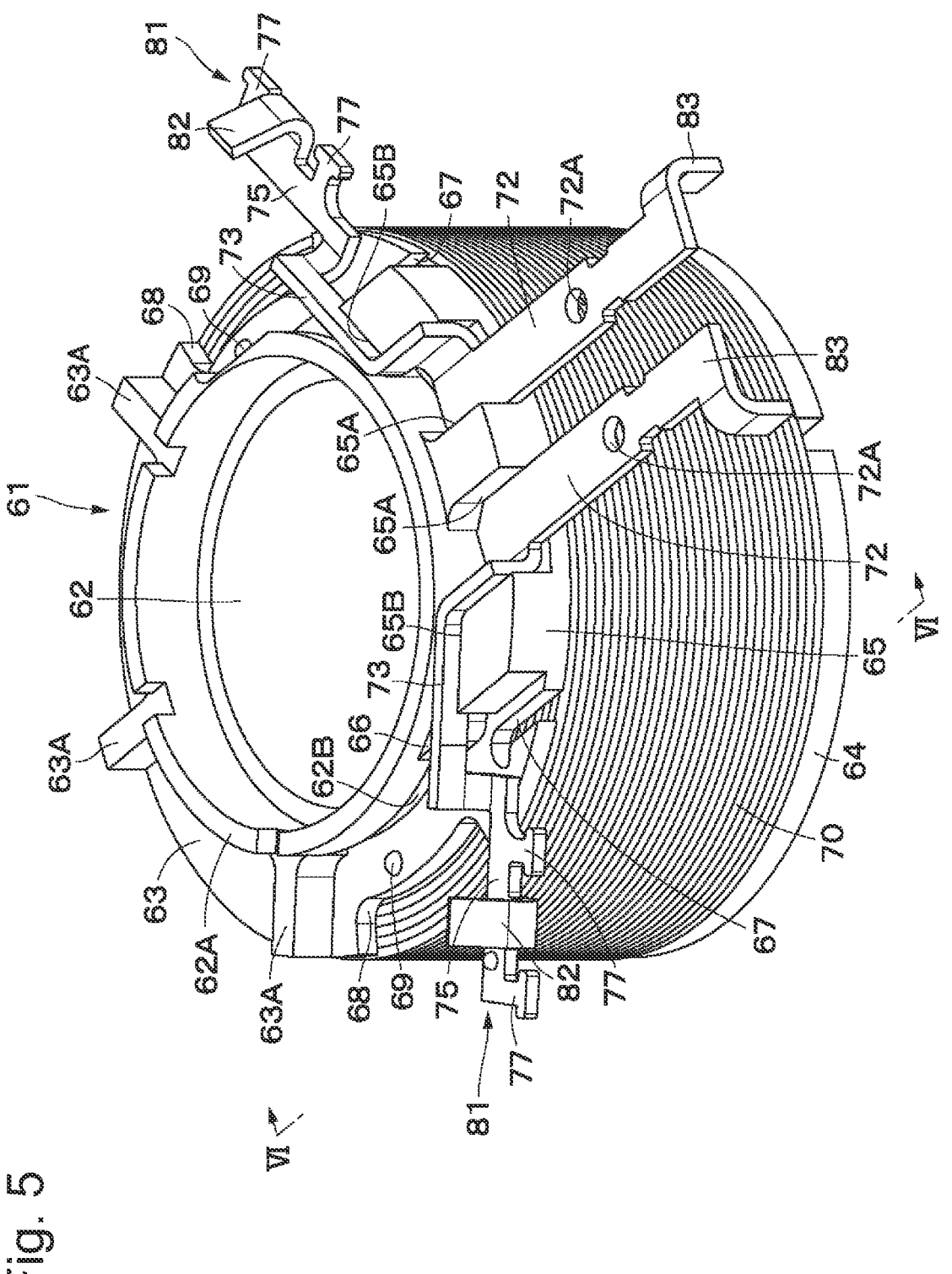
FIG. 5 is a perspective view illustrating the solenoid with a coil wound around the coil bobbin in FIG. 4.
Figure 6:
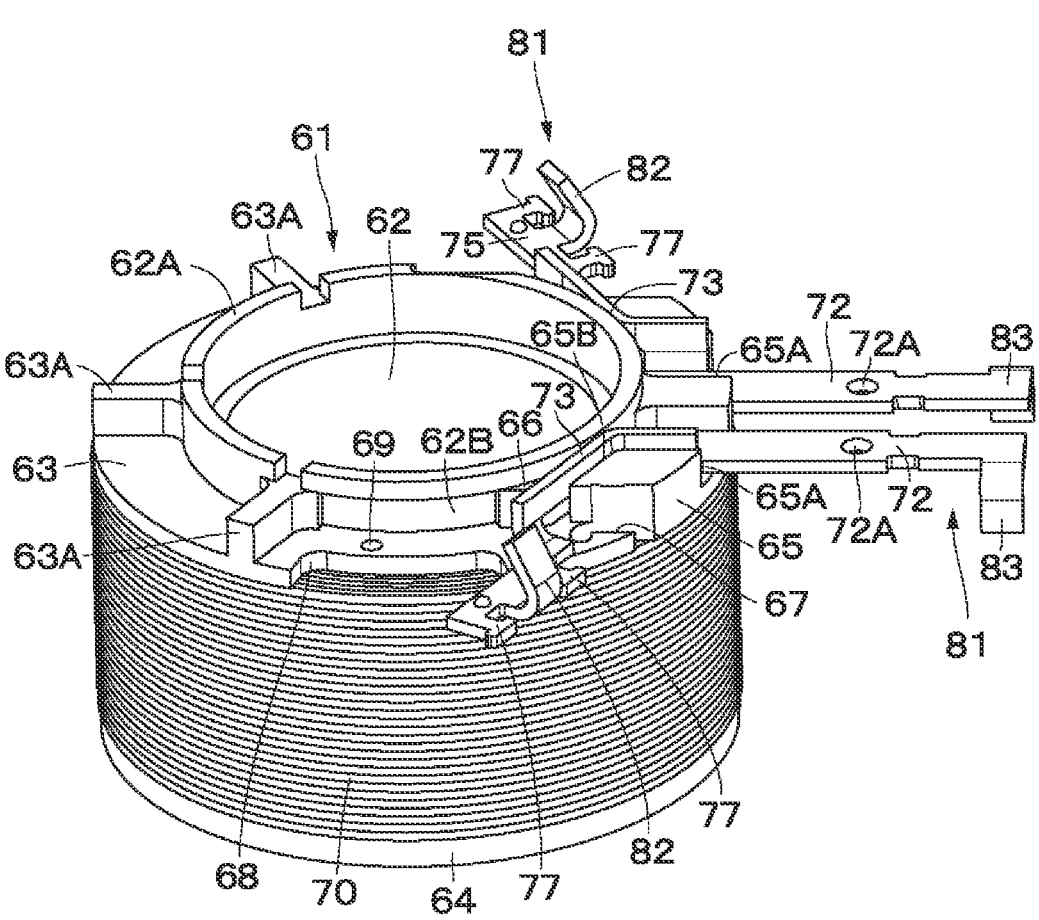
FIG. 6 is a perspective view of the coil bobbin and the like as viewed from a direction indicated by arrows VI-VI in FIG. 5.
Figure 7:
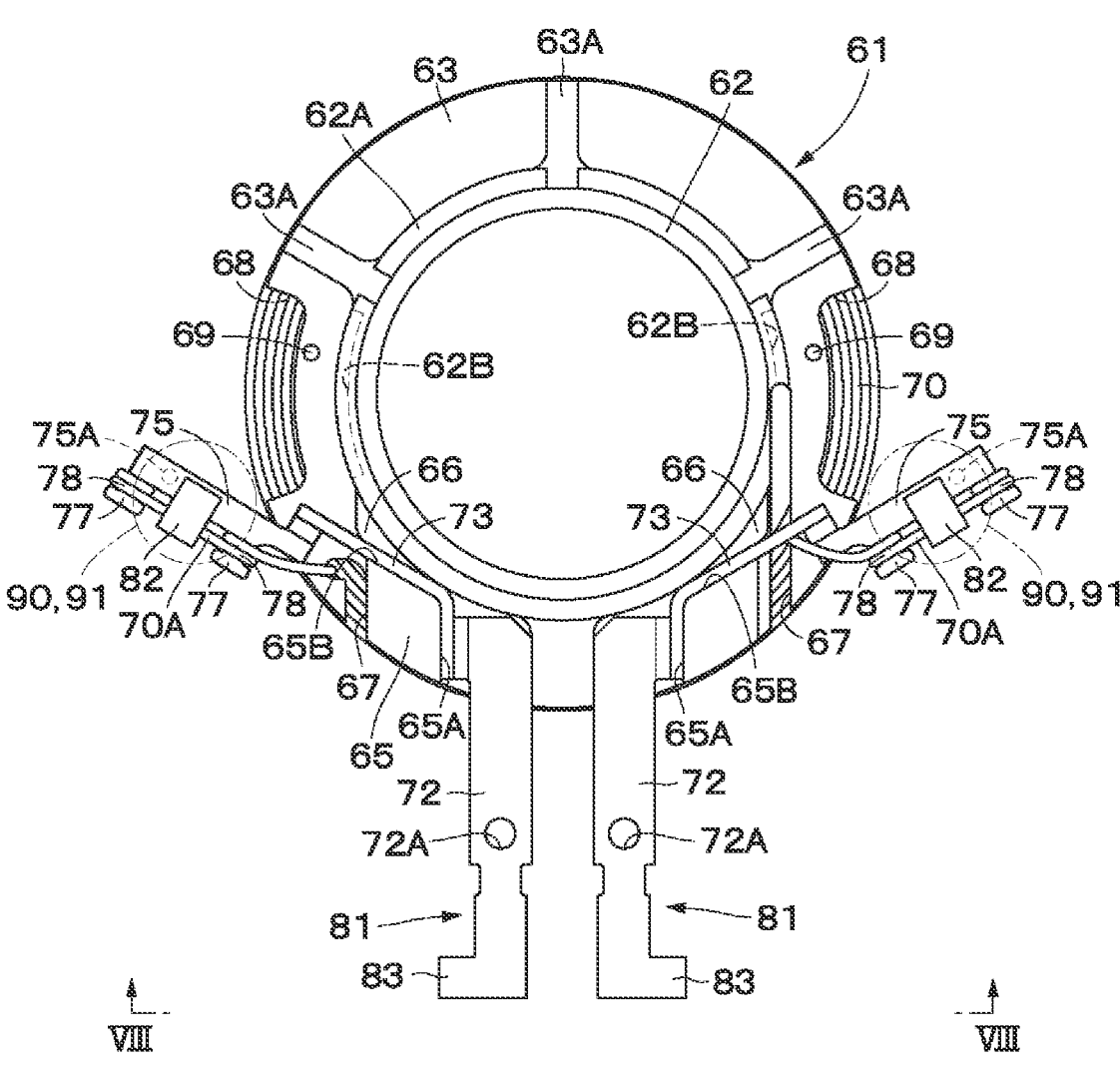
FIG. 7 is a plan view illustrating a winding step.

As illustrated in FIGS. 5 and 6, the coil 70 is wound around the tubular portion 62 of the coil bobbin 61. As illustrated in FIG. 7, the terminal conductor portion 70A of the coil 70 is extracted out from the conductor extraction portion 67 of the first flange portion 63 toward the terminal 81. In a winding step next thereto, the wound portion 78 is formed by winding the terminal conductor portion 70A of the coil 70 around the winding portions 77 of the terminal 71. More specifically, the terminal conductor portion 70A is wound around the winding portion 77 on the proximal end side near the connection portion 73, and, after that, passes through the joint portion 82 and is wound around the winding portion 77 on the distal end side. At this time, the portions where the terminal conductor portion 70A is wound around the winding portions 77 become the wound portions 78.

Figure 8:
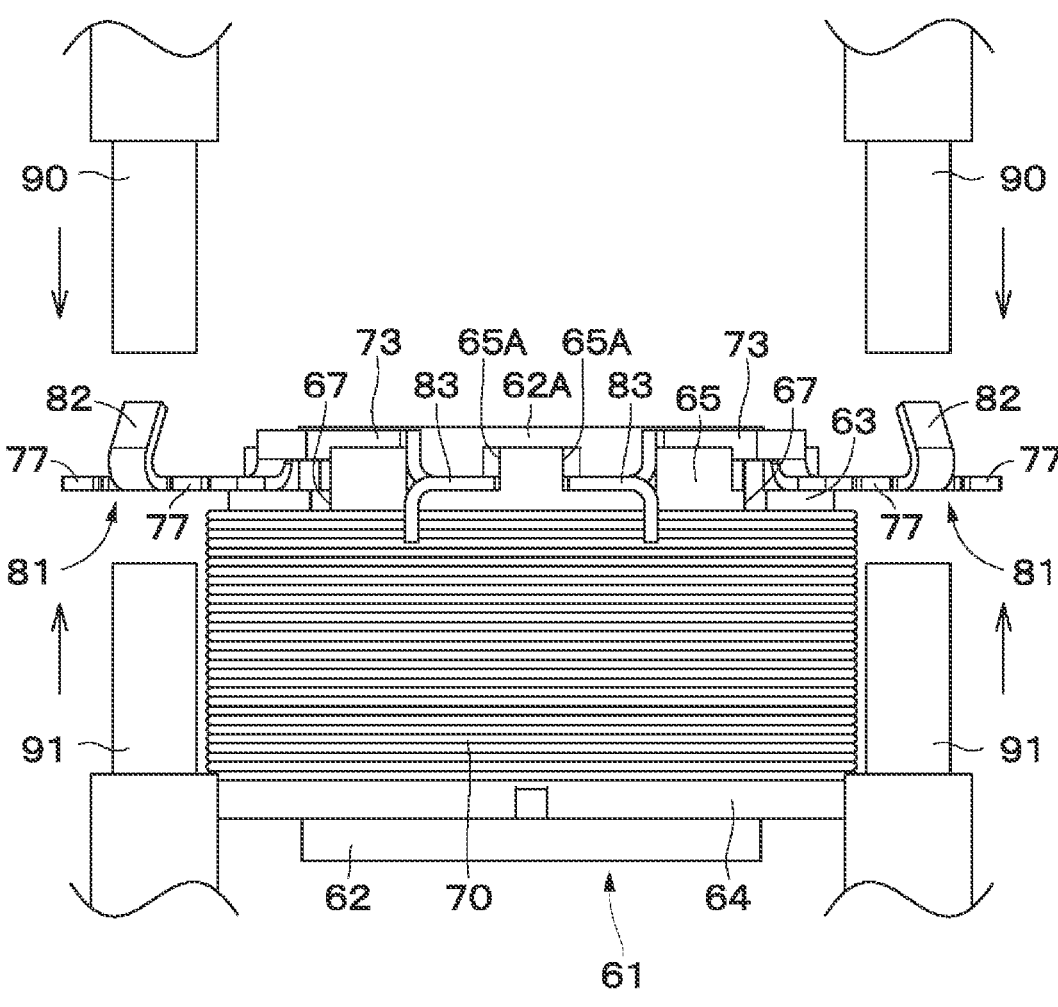
FIG. 8 is a front view illustrating a caulking step as viewed from a direction indicated by arrows VIII-VIII in FIG. 7 with a terminal conductor portion of the coil omitted.

As illustrated in FIGS. 7 and 8, in a caulking step (a fusing step) next thereto, the caulking processing is applied to the terminal 81 and the terminal conductor portion 70A of the coil 70 from the axial direction of the coil bobbin 61. At this time, the small piece of the joint portion 82 is folded back so as to envelop the terminal conductor portion 70A of the coil 70 therein, and the joint portion 82 and the terminal conductor portion 70A are sandwiched in a pressed state by two electrodes 90 and 91 from the both axial sides. At this time, an electric current is applied to between the two electrodes 90 and 91. As a result, the thermal caulking is performed using electric resistance, and the joint portion 76 is formed in which the terminal conductor portion 70A is electrically joined with the terminal 81.

Figure 9:
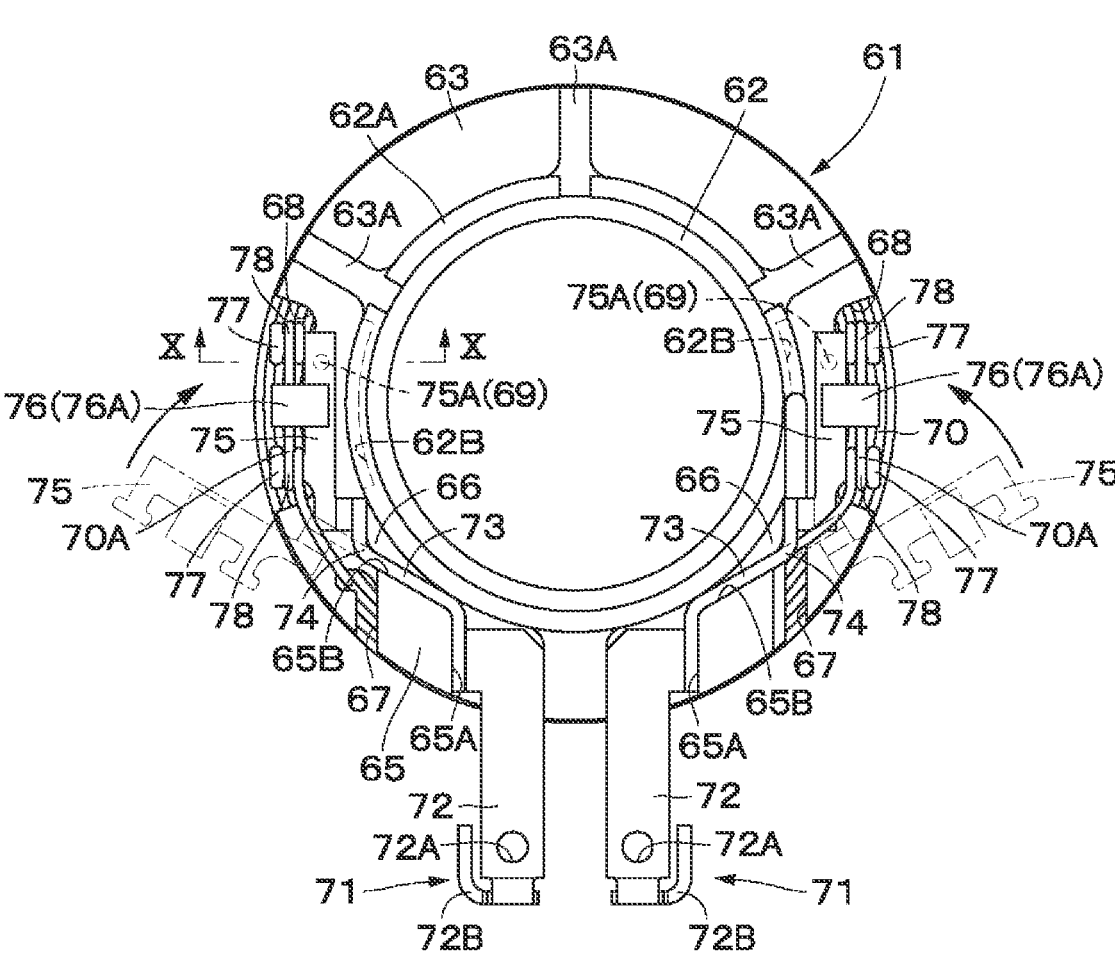
FIG. 9 is a plan view illustrating a bending step.

As illustrated in FIG. 9, in a bending step next thereto, the wound portion 78 of the terminal 81 is bent and deformed to the inner-diameter side with respect to the outer diameter of the first flange portion 63. As a result, the connection portion 73 of the terminal 81 is bent and deformed with the pivot point thereof placed at the support portion 66 provided on the first flange portion 63, and the curved portion 74 is formed.

Figure 10:
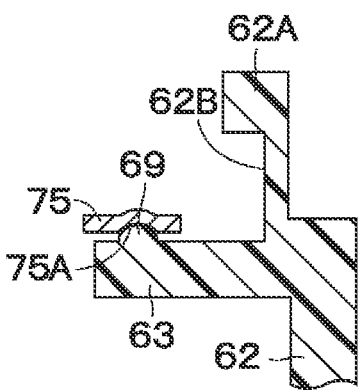
FIG. 10 is an enlarged cross-sectional view illustrating a protrusion portion and an engagement recessed portion as viewed from a direction indicated by arrows X-X in FIG. 9.

At this time, a part of the arm portion 75 is inserted in the recessed portion 62B of the tubular portion 62 when the bending processing is applied to the arm portion 75 and the like of the terminal 81 radially inward (refer to FIG. 10). This prevents the wound portion 78 from protruding radially outward beyond the outer diameter of the first flange portion 63 due to springback. Further, the bending step includes a storage step of storing the wound portion 78 into the cutout portion 68 formed on the first flange portion 63.

In a cable connection step next thereto, bending processing is applied to each of the core wire support portions 83 axially. The bending processing is applied to the small piece of the core wire support portion 83 so as to envelop the core wire 80A of the cable 80 with the core wire support portion 83. At this time, the distal end of the core wire 80A is inserted in the through-hole 72A of the extension portion 72. The distal end of the core wire 80A is electrically joined with the extension portion 72 by pouring, for example, solder into the through-hole 72A in this state. As a result, the core wire support portion 72B is formed on the extension portion 72, and the terminal 71 including the core wire support portion 72B is formed (refer to FIGS. 11 and 12).

In a molding step next thereto, a resin material is poured into the coil bobbin 61 with the coil 70, the terminal 71, and the cable 80 attached thereto, and is molded. At this time, the molding processing is applied by introducing the resin material from the cutout portion 68. As a result, the resin member 79 is attached around the coil bobbin 61 with the coil 70, the terminal 71, and the like surrounded thereby. At this time, the cable extraction portion 60B with the distal end side of the cable 80 contained therein is formed on the resin member 79. As a result, the molded coil 60 is formed.

In a plunger attachment step next thereto, the cover member 51 is attached to the one end side (the first flange portion 63 side) of the molded coil 60. At this time, the cylinder 44, the armature 48, the actuation pin 49, and the like are inserted inside the coil bobbin 61. After that, the yoke 39, the anchor 41, and the like are attached to the opposite end side (the second flange portion 64 side) of the molded coil 60. As a result, the solenoid 33 is completed (refer to FIG. 3).

The solenoid 33, the damping force adjustment mechanism 17, and the hydraulic shock absorber 1 according to the present embodiment are configured in the above-described manner, and the operations thereof will be described next.

First, when the hydraulic shock absorber 1 is mounted on a vehicle such as an automobile, for example, the upper end side (the protrusion end side) of the piston rod 8 is attached to the vehicle body side of the vehicle, and the mounting eye 3A side provided on the bottom cap 3 is attached to the wheel side. Further, the solenoid 33 of the damping force adjustment mechanism 17 is connected to a control apparatus (a controller) provided on the vehicle body side of the vehicle via the cable 80 and the like.

When the vehicle runs, upon occurrence of a vertical vibration due to unevenness of a road surface or the like, the piston rod 8 is displaced so as to extend or compress from and into the outer tube 2, and therefore the damping force can be generated by the damping force adjustment mechanism 17 and the like and the vibration of the vehicle can be damped. At this time, the generated damping force of the hydraulic shock absorber 1 can be variably adjusted by controlling a current value directed to the coil 70 of the solenoid 33 using the controller to thus adjust the valve-opening pressure of the pilot valve member 32.

For example, during the extension stroke of the piston rod 8, the compression-side check valve 7 of the piston 5 is closed due to the movement of the piston 5 in the inner tube 4. Before the disk valve 6 of the piston 5 is opened, the oil fluid in the rod-side oil chamber B is pressurized, thereby being delivered into the oil passage 20B of the connection tubular member 20 of the damping force adjustment valve 18 via the oil hole 4A of the inner tube 4, the annular oil chamber D, and the connection port 12C of the intermediate tube 12. At this time, the oil fluid flows from the reservoir chamber A into the bottom-side oil chamber C by opening the extension-side check valve 16 of the bottom valve 13 by an amount corresponding to the movement of the piston 5. When the pressure in the rod-side oil chamber B reaches the valve-opening pressure of the disk valve 6, this disk valve 6 is opened and relieves the pressure in the rod-side oil chamber B by releasing it into the bottom-side chamber C.

In the damping force adjustment mechanism 17, before the main valve 23 is opened (in a low piston speed region), the oil fluid delivered into the oil passage 20B of the connection tubular member 20 is transmitted into the pilot body 26 by passing through the central hole 21A of the valve member 21, the central hole 24B of the pilot pin 24, and the central hole 26C of the pilot body 26, and pushing and opening the pilot valve member 32, as indicated by the arrow X in FIG. 2. Then, the oil fluid transmitted into the pilot body 26 flows into the reservoir chamber A by passing through between the flange portion 32A of the pilot valve member 32 and the disk valve 29, the oil passage 30A of the holding plate 30, the cutouts 31A of the cap 31, and the oil chamber 19C of the valve case 19. When the pressure in the oil passage 20B of the connection tubular member 20, i.e., the pressure in the rod-side oil chamber B reaches the valve-opening pressure of the main valve 23 according to an increase in the piston speed, the oil fluid delivered into the oil passage 20B of the connection tubular member 20 flows into the reservoir chamber A by passing through the oil passages 21B of the valve member 21, pushing and opening the main valve 23, and passing through the oil chamber 19C of the valve case 19, as indicated by the arrow Y in FIG. 2.

On the other hand, during the compression stroke of the piston rod 8, the compression-side check valve 7 of the piston 5 is opened and the extension-side check valve 16 of the bottom valve 13 is closed due to the movement of the piston 5 in the inner tube 4. Before the bottom valve 13 (the disk valve 15) is opened, the oil fluid in the bottom-side oil chamber C flows into the rod-side oil chamber B. Along therewith, the oil fluid flows from the rod-side oil chamber B into the reservoir chamber A via the damping force adjustment valve 18 by passing through a similar route to the route during the extension stroke by an amount corresponding to the entry of the piston rod 8 into the inner tube 4. When the pressure in the bottom-side chamber C reaches the valve-opening pressure of the bottom valve 13 (the disk valve 15), the bottom valve 13 (the disk valve 15) is opened and relieves the pressure in the bottom-side oil chamber C by releasing it into the reservoir chamber A.

As a result, during the extension stroke and the compression stroke of the piston rod 8, the damping force is generated due to the orifice 24C of the pilot pin 24 and the valve-opening pressure of the pilot valve member 32 before the main valve 23 of the damping force adjustment valve 18 is opened, and is generated according to the valve lift of the main valve 23 after this main valve 23 is opened. In this case, the damping force can be directly controlled regardless of the piston speed by adjusting the valve-opening pressure of the pilot valve member 32 using the power supply to the coil 70 of the solenoid 33.

More specifically, supplying a lower current to the coil 70 to reduce the thrust force on the armature 48 leads to a reduction in the valve-opening pressure of the pilot valve member 32, thereby resulting in generation of a soft-side damping force. On the other hand, supplying a higher current to the coil 70 to increase the thrust force on the armature 48 leads to an increase in the valve-opening pressure of the pilot valve member 32, thereby resulting in generation of a hard-side damping force. At this time, the valve-opening pressure of the pilot valve member 32 causes a change in the inner pressure in the back-pressure chamber 27 in communication via the oil passages 25 on the upstream side thereof. According thereto, controlling the valve-opening pressure of the pilot valve member 32 can be accompanied by adjusting the valve-opening pressure of the main valve 23 at the same time, thereby resulting in an increase in the adjustable range of the damping force characteristic.

In a case where the thrust force on the armature 48 is lost due to, for example, disconnection of the coil 70, the pilot valve member 32 is retracted (displaced in the direction away from the valve seat portion 26E) by the return spring 28, and the flange portion 32A of the pilot valve member 32 and the disk valve 29 abut against each other. In this state, a damping force can be generated due to the valve-opening pressure of the disk valve 29, and a required damping force can be acquired even at the time of a malfunction such as a disconnection of the coil.

In this manner, according to the present embodiment, the terminal 71 is a member that connects the terminal conductor portion 70A of the coil 70 and the cable 80, and includes the joint portion 76 that joins the terminal conductor portion 70A of the coil 70. The joint portion 76 extends in the direction along the one end surface of the first flange portion 63 of the coil bobbin 61. Therefore, compared to a configuration using a terminal including an axially extending joint portion like the conventional technique, the present embodiment can reduce the required length of the joint portion 76 in the axial length direction, thereby reducing the axial length of the solenoid 33. As a result, the present embodiment can also reduce the axial length of the damping force adjustment mechanism 17 including the solenoid 33, thereby increasing the flexibility of the damping force adjustment mechanism 17 and the hydraulic shock absorber 1 for mounting onto a vehicle.

The terminal 71 includes the winding portion 77 around which the terminal conductor portion 70A of the coil 70 is wound, and the winding portion 77 and the arm portion 75 extending from the winding portion 77 extend together with the joint portion 76 in the direction in which the joint portion 76 is disposed along the one end surface of the first flange portion 63 of the coil bobbin 61. Therefore, the winding portion 77 and the arm portion 75 can also be disposed along the one end surface of the first flange portion 63, in addition to the joint portion 76. As a result, the present embodiment can reduce the axial dimensions of the joint portion 76, the winding portion 77, and the arm portion 75, thereby reducing the axial length of the solenoid 33.

The joint portion 76, which joins the terminal 71 and the terminal conductor portion 70A of the coil 70, includes the caulked portion 76A subjected to the caulking processing. In addition thereto, the caulked portion 76A is subjected to the caulking processing so as to be folded back in the axial direction of the tubular portion 62 of the coil bobbin 61 and sandwich the terminal conductor portion 70A of the coil 70 therein. As a result, the terminal 71 and the terminal conductor portion 70A of the coil 70 can be electrically connected using the caulked portion 76A.

The winding portion 77 of the terminal 71 is disposed so as to be located inside the first flange portion 63 of the coil bobbin 61. Therefore, the winding portion 77 of the terminal 71 does not protrude radially outward beyond the outer peripheral edge of the first flange portion 63, and the radial dimension of the solenoid 33 can be reduced.

The terminal 71 includes the curved portion 74 curved to the radially inner side of the coil bobbin 61, and the coil bobbin 61 includes the support portion 66 in abutment with the curved portion 74 of the terminal 71. Therefore, the support portion 66 can support the connection portion 73 of the terminal 71 when the bending processing is applied to the terminal 71. As a result, the curved portion 74 can be formed on the terminal 71 at the position corresponding to the support portion 66.

The cutout portion 68, which is cut out in the axial direction and the radial direction of the tubular portion 62, is formed on the first flange portion 63 of the coil bobbin 61, and the winding portion 77 of the terminal 71 is disposed in the cutout portion 68. The wound portion 78 is formed by winding the terminal conductor portion 70A of the coil 70 around the winding portion 77 of the terminal 71. Disposing the winding portion 77 in the cutout portion 68 prevents the wound portion 78 from interfering with the first flange portion 68.

The cutout portion 68 is subjected to the molding processing using resin. At this time, a space is created in the cutout portion 68 at a position around the winding portion 77 of the terminal 71. Therefore, when the molded coil 60 is formed by the molding processing, the present embodiment allows the resin material to be poured in from the cutout portion 68, and allows the resin member 79 to cover around the coil 70, the joint portion 76 of the terminal 71, and the winding portion 77 therewith.

The protrusion portion 69 is formed on the one end surface of the first flange portion 63 of the coil bobbin 61. The protrusion portion 69 protrudes so as to abut against the terminal 71. When the bending processing is applied to the winding portion 77 of the terminal 71 radially inward, a radially outward force is exerted on the winding portion 77 due to springback. At this time, the protrusion portion 69 and the engagement recessed portion 75A can be engaged with each other by inserting the protrusion portion 69 into the engagement recessed portion 75A of the terminal 71. As a result, the wound portion 78 can be prevented from being deformed radially outward beyond the outer diameter of the first flange portion 63.

The recessed portion 62B is formed on the tubular portion 62 of the coil bobbin 61. The recessed portion 62B allows the terminal 71 to be deformed in the inner-diameter direction with respect to the outer diameter of the tubular portion 62. At this time, a part of the arm portion 75 is inserted into the recessed portion 62B of the tubular portion 62 when the bending processing is applied to the arm portion 75 of the terminal 81 and the like radially inward. As a result, the wound portion 78 can be prevented from protruding radially outward beyond the outer diameter of the first flange portion 63 due to springback.

Further, the method for manufacturing the solenoid 33 includes the winding step of winding the terminal conductor portion 70A of the coil 70 around the winding portion 77 of the terminal 81 to form the wound portion 78, and the caulking step of applying the caulking processing to the terminal 81 and the terminal conductor portion 70A of the coil 70 from the axial direction. Therefore, the present embodiment can allow the caulking processing to be applied to the terminal 81 and the terminal conductor portion 70A of the coil 70 from the axial direction with the terminal conductor portion 70A of the coil 70 held by the wound portion 78, thereby preventing a joining failure of the terminal conductor portion 70A.

The method for manufacturing the solenoid 33 includes the bending step of deforming the wound portion 78 to the inner-diameter side with respect to the outer diameter of the first flange portion 63. Due to that, the present embodiment allows the caulking step to be performed with the wound portion 78 and the joint portion 82 protruding to the outer-diameter side beyond the outer diameter of the first flange portion 63. Therefore, the present embodiment can prevent the electrodes 90 and 91 used in the caulking step from interfering with the first flange portion 63 and the coil 70, thereby facilitating the caulking step.

In addition thereto, the bending step includes the storage step of storing the wound portion 78 into the cutout portion 68 formed on the first flange portion 63. Therefore, the present embodiment allows the wound portion 78 and the joint portion 76 to be disposed on the inner-diameter side with respect to the outer diameter of the first flange portion 63 and the wound portion 78 to be stored in the cutout portion 68 by performing the bending step after the caulking step is completed and the joint portion 76 (the caulked portion 76A) is formed. As a result, the radial dimension of the solenoid 33 can be reduced.

The method for manufacturing the solenoid 33 includes the molding step of pouring the resin from the cutout portion 68 and molding it. Therefore, the present embodiment allows the resin material to be poured from the cutout portion 68 to reach around the coil 70 and around the wound portion 78 of the terminal 71. As a result, the present embodiment allows the resin member 79 to cover around the coil 70, the joint portion 76 of the terminal 71, and the winding portion 77 therewith.

The coil bobbin 61 is assumed to include the first flange portion 63 and the second flange portion 64 in the embodiment, but the second flange portion 64 may be omitted. Further, in the embodiment, the terminal 71 is assumed to include the two winding portions 77. Without being limited thereto, the terminal may include any one of the two winding portions, or may not include the winding portion.

In the embodiment, the protrusion portion 69 is provided on the coil bobbin 61. Without being limited thereto, the protrusion portion 69 may be omitted in a case where, for example, large springback does not occur on the terminal 71 during the bending step. The recessed portion 62B provided on the tubular portion 62 may be omitted for the same reason.

The embodiment has been described citing the normally-opened damping force adjustment mechanism 17 (the solenoid valve) in which the pilot valve member 32 (the valve member) is biased in the direction away from the valve seat portion 26E by the return spring 28 as an example. Without being limited thereto, a normally-closed solenoid valve may be constructed.

The embodiment has been described citing the example in which the solenoid 33 is configured as a proportional solenoid. However, without being limited thereto, the solenoid may be configured as, for example, an ON/OFF-type solenoid.

The embodiment has been described citing the example in which the solenoid 33 is used as the damping force variable actuator of the hydraulic shock absorber 1, i.e., the pilot valve member 32 constituting the pilot valve of the damping force adjustment valve 18 is set as the driving target. However, without being limited thereto, the solenoid can be widely used as an actuator built in various kinds of mechanical apparatuses such as a valve used in a hydraulic circuit, i.e., as a driving apparatus that drives a driving target that should be linearly driven.

Possible configurations as the solenoid, the solenoid valve, the shock absorber, and the method for manufacturing the solenoid based on the above-described embodiment include the following examples.

As a first configuration, a solenoid includes a bobbin including a tubular portion and a large-diameter portion formed on one end of the tubular portion and extending radially to outside the tubular portion, a coil wound around the bobbin, a terminal configured as a member that connects a terminal conductor portion of the coil and an external electric wire and including a joint portion that joins the terminal conductor portion of the coil and extends in a direction along one end surface of the large-diameter portion of the bobbin, a magnetic core fixed to an inner periphery of the coil, and a magnetic plunger provided movably closer to the core.

As a second configuration, in the first configuration, the terminal includes a winding portion around which the terminal conductor portion of the coil is wound. The winding portion and an arm portion extending from the winding portion extend together with the joint portion in a direction in which the joint portion is disposed along the one end surface of the large-diameter portion of the bobbin.

As a third configuration, in the second configuration, the joint portion joining the terminal and the terminal conductor portion of the coil includes a caulked portion subjected to caulking processing. The caulked portion is subjected to the caulking processing so as to be folded back in an axial direction of the tubular portion of the bobbin and sandwich the terminal conductor portion of the coil therein.

As a fourth configuration, in the second or third configuration, the winding portion of the terminal is disposed so as to be located inside the large-diameter portion of the bobbin.

As a fifth configuration, in the fourth configuration, the terminal includes a curved portion curved toward a radially inner side of the bobbin. The bobbin includes a support portion in abutment with the curved portion of the terminal.

As a sixth configuration, in any of the second to fifth configurations, a cutout portion is formed on the large-diameter portion of the bobbin. The cutout portion is cut out in an axial direction and a radial direction of the tubular portion. The winding portion is disposed in the cutout portion.

As a seventh configuration, in the sixth configuration, the cutout portion is subjected to molding processing using resin.

As an eighth configuration, in any of the first to seventh configurations, a protrusion portion is formed on the one end surface of the large-diameter portion of the bobbin. The protrusion portion protrudes so as to abut against the terminal.

As a ninth configuration, in any of the first to seventh configurations, a recessed portion is formed on the tubular portion of the bobbin. The recessed portion is configured to allow the terminal to be deformed in an inner-diameter direction with respect to an outer diameter of the tubular portion.

As a tenth configuration, a solenoid valve includes the solenoid according to any of the first to ninth configurations, and a valve member on an inner periphery of the coil. The valve member is configured to be driven by the solenoid.

As an eleventh configuration, a shock absorber includes the solenoid valve according to the tenth configuration. The shock absorber includes a cylinder sealingly containing hydraulic fluid therein, a piston inserted in the cylinder and dividing an inside of the cylinder into a one-side chamber and an opposite-side chamber, a piston rod coupled with the piston and extending out of the cylinder, a flow path in which a flow of the hydraulic fluid is generated due to a movement of the piston rod, and the solenoid valve in which an opening area of the flow passage is adjusted by the solenoid.

A twelfth configuration is a method for manufacturing a solenoid. The solenoid includes a bobbin including a tubular portion and a large-diameter portion formed on one end of the tubular portion and extending radially to outside the tubular portion, a coil wound around the bobbin, and a terminal configured as a member that connects a terminal conductor portion of the coil and an external electric wire and is fixed to the large-diameter portion. The terminal includes a winding portion around which the terminal conductor portion of the coil is wound, and a caulked portion subjected to caulking processing so as to sandwich the terminal conductor portion therein. The caulked portion is configured to be folded back in an axial direction of the tubular portion of the bobbin. The solenoid further includes a magnetic core fixed to an inner periphery of the coil, and a magnetic plunger provided movably closer to the core. The method for manufacturing the solenoid includes a winding step of forming a wound portion by winding the terminal conductor portion of the coil around the winding portion of the terminal, and a caulking step of applying the caulking processing to the terminal and the terminal conductor portion of the coil from the axial direction.

As a thirteenth configuration, the twelfth configuration further includes a bending step of deforming the wound portion to an inner-diameter side with respect to an outer diameter of the large-diameter portion.

As a fourteenth configuration, in the thirteenth configuration, the solenoid includes a cutout portion provided on the large-diameter portion of the bobbin and cut out in the axial direction and a radial direction of the tubular portion. The bending step includes a storage step of storing the wound portion into the cutout portion formed on the large-diameter portion.

As a fifteenth configuration, the fourteenth configuration further includes a molding step of pouring resin from the cutout portion and molding it.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2020-178999 filed on Oct. 26, 2020. The entire disclosure of Japanese Patent Application No. 2020-178999 filed on Oct. 26, 2020 including the specification, the claims, the drawings, and the abstract is incorporated herein by reference in its entirety.

REFERENCE SIGNS LIST 1 damping force adjustable shock absorber (shock absorber)
4 inner tube (cylinder)
5 piston
8 piston rod
17 damping force adjustment mechanism (solenoid valve)
32 pilot valve member (valve member)
33 solenoid
36 housing (core)
39 yoke
41 anchor (stator)
48 armature (movable element)
49 actuation pin
61 coil bobbin (bobbin)
62 tubular portion
62B recessed portion
63 first flange portion (large-diameter portion)
64 second flange portion
66 support portion
68 cutout portion
69 protrusion portion
70 coil
70A terminal conductor portion
71 terminal
74 curved portion
75 arm portion
75A engagement recessed portion
76 joint portion
76A caulked portion
77 winding portion
78 wound portion
80 cable (external electric wire)
80A core wire
B rod-side oil chamber (one-side chamber)
C bottom-side oil chamber (opposite-side chamber)
D annular oil passage (flow passage)

The invention claimed is:
1. A solenoid comprising:
a bobbin including a tubular portion, and a large-diameter portion formed on one end of the tubular portion and extending radially to outside the tubular portion;
a coil wound around the bobbin;
a terminal configured as a member that connects a terminal conductor portion of the coil and an external electric wire and including a joint portion that joins the terminal conductor portion of the coil, the joint portion extending in a direction along one end surface of the large-diameter portion of the bobbin;
a magnetic core fixed to an inner periphery of the coil; and
a magnetic plunger provided movably closer to the core,

wherein the terminal includes a winding portion around which the terminal conductor portion of the coil is wound, and the winding portion and an arm portion extending from the winding portion extend together with the joint portion in a direction in which the joint portion is disposed along the one end surface of the large-diameter portion of the bobbin,
wherein the terminal further includes a curved portion curved toward a radially inner side of the bobbin so as to cause the winding portion of the terminal to be located inside the large-diameter portion of the bobbin,
wherein the curved portion is curved by being supported by a support portion provided on the bobbin,
wherein the terminal further includes an extension portion, and the extension portion includes a first extension portion extending outward in the radial direction of the bobbin and a second extension portion extending in a central axial direction of the bobbin from a distal end of the first extension portion, thereby forming the extension portion in the shape of the letter L, and
wherein the second extension portion holds the external wire.
2. The solenoid according to claim 1, wherein the joint portion joining the terminal and the terminal conductor portion of the coil includes a caulked portion subjected to caulking processing, and
wherein the caulked portion is subjected to the caulking processing so as to be folded back in an axial direction of the tubular portion of the bobbin and sandwich the terminal conductor portion of the coil therein.
3. The solenoid according to claim 2, wherein the winding portion of the terminal is disposed so as to be located inside the large-diameter portion of the bobbin.
4. The solenoid according to claim 1, wherein a cutout portion is formed on the large-diameter portion of the bobbin, the cutout portion being cut out in an axial direction and a radial direction of the tubular portion, and
wherein the winding portion is disposed in the cutout portion.
5. The solenoid according to claim 4, wherein the cutout portion is subjected to molding processing using resin.
6. The solenoid according to claim 1, wherein a protrusion portion is formed on the one end surface of the large-diameter portion of the bobbin, the protrusion portion protruding so as to abut against the terminal and fix the terminal.
7. The solenoid according to claim 1, wherein a recessed portion is formed on the tubular portion of the bobbin, the recessed portion being configured to allow the terminal to be deformed in an inner-diameter direction with respect to an outer diameter of the tubular portion.
8. A solenoid valve comprising:
the solenoid according to claim 1; and
a valve member on an inner periphery of the coil, the valve member being configured to be driven by the solenoid.
9. A shock absorber including the solenoid valve according to claim 8, the shock absorber comprising:
a cylinder sealingly containing hydraulic fluid therein;
a piston inserted in the cylinder and dividing an inside of the cylinder into a one-side chamber and an opposite-side chamber;
a piston rod coupled with the piston and extending out of the cylinder;
a flow path in which a flow of the hydraulic fluid is generated due to a movement of the piston rod; and
the solenoid valve in which an opening area of the flow passage is adjusted by the solenoid.

10. A method for manufacturing a solenoid according to claim 1, wherein the terminal includes a caulked portion subjected to caulking processing so as to sandwich the terminal conductor portion therein, the caulked portion being configured to be folded back in an axial direction of the tubular portion of the bobbin, the method for manufacturing the solenoid comprising:

a winding step of forming a wound portion by winding the terminal conductor portion of the coil around the winding portion of the terminal;

a caulking step of applying the caulking processing to the terminal and the terminal conductor portion of the coil from the axial direction; and a bending step of bending the terminal along the support portion of the bobbin so as to deform the wound portion of the coil to an inner-diameter side with respect to an outer diameter of the large-diameter portion.

11. The method for manufacturing the solenoid according to claim 10, wherein the solenoid includes a cutout portion provided on the large-diameter portion of the bobbin and cut out in the axial direction and a radial direction of the tubular portion, and wherein the bending step includes a storage step of storing the wound portion into the cutout portion formed on the large-diameter portion.

12. The method for manufacturing the solenoid according to claim 11, further comprising a molding step of pouring resin from the cutout portion and molding it.

* * * * *